(12) United States Patent
Ye et al.

(10) Patent No.: US 8,275,045 B2
(45) Date of Patent: Sep. 25, 2012

(54) VIDEO COMPRESSION USING ADAPTIVE VARIABLE LENGTH CODES

(75) Inventors: Yan Ye, San Diego, CA (US); Yiliang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1421 days.

(21) Appl. No.: 11/743,998

(22) Filed: May 3, 2007

(65) Prior Publication Data

US 2008/0013633 A1   Jan. 17, 2008

Related U.S. Application Data

(60) Provisional application No. 60/830,491, filed on Jul. 12, 2006.

(51) Int. Cl.
*H04N 7/12*   (2006.01)
(52) U.S. Cl. .................................. 375/240.23
(58) Field of Classification Search .............. 375/240.23
See application file for complete search history.

(56) References Cited

U.S. PATENT DOCUMENTS

| | | | |
|---|---|---|---|
| 5,400,075 A | 3/1995 | Savatier | |
| 6,069,575 A | 5/2000 | Kinouchi et al. | |
| 6,144,322 A | 11/2000 | Sato | |
| 2003/0009722 A1 | 1/2003 | Sugiyama et al. | |
| 2003/0151529 A1 | 8/2003 | Karczewicz | |
| 2006/0273939 A1 | 12/2006 | Tanaka et al. | |

FOREIGN PATENT DOCUMENTS

| | | |
|---|---|---|
| EP | 1248468 | 10/2002 |
| JP | EP 1248468 | * 10/2002 |
| JP | 2006100993 A | 4/2006 |
| KR | 19990082486 | 11/1999 |
| KR | 1020000036266 | 7/2000 |
| KR | 20040075945 | 8/2004 |
| RU | 2119727 | 9/1998 |
| RU | 2004125588 | 1/2006 |
| WO | WO2006060037 A1 | 6/2006 |

OTHER PUBLICATIONS

Shima M: "CEI: Complexity reduGtio~1 for ad~ptive VLC" Geneva: ISO, CH, 10 Jail 2006, XP030006289.*

(Continued)

*Primary Examiner* — Gilberto Barron, Jr.
*Assistant Examiner* — Devin Almeida
(74) *Attorney, Agent, or Firm* — Brent A. Boyd

(57) ABSTRACT

Adaptive variable length coding techniques may be used for entropy coding of residual block coefficients produced by predictive video coding. The techniques may be applied to schemes that code positions of nonzero transform coefficients using zero runs. Coding parameters such as end of block (EOB) shift and VLC codebook selection tables may be maintained as internal states, instead of sending them with coded video slice data. Table entries may be periodically updated based on statistics collected during a coding pass. A special EOB shift table may adapt the position of a special EOB symbol in a symbol set to probability of significant coefficients with magnitude greater than one for a coding condition, such as a coding cycle. Chroma blocks may be coded independently of luma blocks using separate EOB shift, special EOB shift, and VLC codebook selection tables.

54 Claims, 9 Drawing Sheets

OTHER PUBLICATIONS

Ridge Jet Al: "Variable length codes for SVC" Geneva: ISO, CH, Jul. 22, 2005, XP030006095.*

Thomas Wiegand, Gary Sullivan, Julien Reichel, Heiko Schwarz, and Mathias Wien, Joint Draft 6 (SVC JD6), "Joint Draft 6: Scalable Video Coding," JVT-S 201, Apr. 2006, Geneva.

Thomas Wiegand, Gary Sullivan, Julien Reichel, Heiko Schwarz, and Mathias Wien, Joint Draft 9 (SVC JD9), "Joint Draft 9 of SVC Amendment," JVT-V 201, Jan. 2007, Marrakech, Morocco.

Y. Ye, Y. Bao: "Adaptive Variable Length Coding for FGS" JVT 20TH Meeting, Jul. 15, 2006-Jul. 21, 2006, XP002460219.

Shima M: "CE1: Complexity reduction for adaptive VLC" Geneva: ISO, CH, Jan. 10, 2006, XP030006289.

Ridge J et al: "Variable length codes for SVC" Geneva: ISO, CH, Jul. 22, 2005, XP030006095.

Julien Reichel, Heiko Scharz, Mathias Wien: "Joint Scalable Video Model JSVM-9" Joint Video Team (JVT) of ISO/IEC MPEG & ITU-T VCEG, Document JVT-U202, Jan. 13-19, 2007, 22nd Meeting. Marrakech, Morocco.

International Search Report—PCT/US07/073003, International Search Authority—European Patent Office—Dec. 17, 2007.

Shima, M. "Modified VLC for Refinement Pass," Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, No. JVT-S031, Mar. 31 2006, XP030006410, pp. 1-8.

Written Opinion—PCT/US07/073003, International Search Authority, European Patent Office, Dec. 17, 2007.

Taiwan Search Report—TW096125455—Tipo—Aug. 31, 2011.

* cited by examiner

4x4 block in base
or previous layer

4x4 block in
current FGS layer

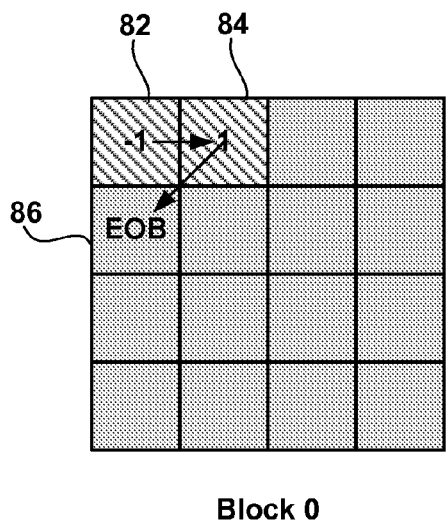
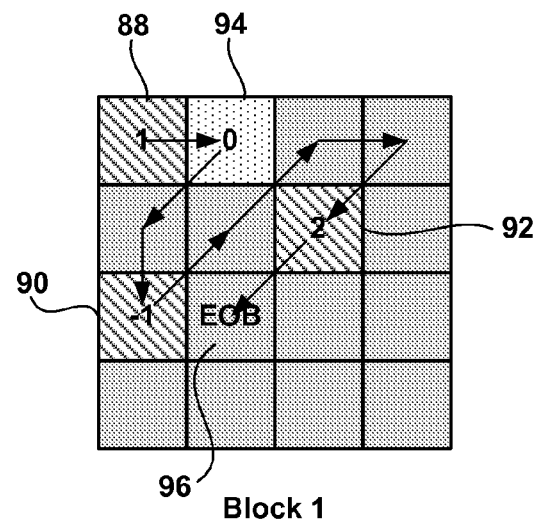
FIG. 6     FIG. 7

VIDEO COMPRESSION USING ADAPTIVE VARIABLE LENGTH CODES

This application claims the benefit of U.S. Provisional Application No. 60/830,491, filed Jul. 12, 2006, the entire content of which is incorporated herein by reference.

TECHNICAL FIELD

This disclosure relates to digital video and, more particularly, compression of digital video using variable length codes (VLCs).

BACKGROUND

Digital video capabilities can be incorporated into a wide range of devices, including digital televisions, digital direct broadcast systems, wireless communication devices, personal digital assistants (PDAs), laptop or desktop computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently. Video compression techniques perform spatial and temporal prediction to reduce or remove redundancy inherent in video signals.

In video coding, video compression generally includes spatial prediction, motion estimation and motion compensation. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

The video encoder applies transform, quantization and entropy coding processes to further reduce the bit rate of the residual block. Entropy coding generally involves the application of arithmetic codes or variable length codes (VLCs) to further compress residual coefficients produced by the transform and quantization operations. Examples include context-adaptive binary arithmetic coding (CABAC) and context-adaptive variable length coding (CAVLC), which may be used as alternative entropy coding modes in some encoders. A video decoder performs inverse operations to reconstruct the encoded video, using the motion information and residual information for each of the blocks.

SUMMARY

In general, the disclosure is directed to techniques for adaptive variable length coding (VLC) of digital video. In particular, the adaptive VLC techniques may be used for entropy coding of residual coefficients produced by a predictive coding process. The techniques may be applied to video coding schemes that code the positions of nonzero transform coefficients using runs of zeros. As one example, the techniques may be applied to code transform coefficients in a fine granularity scalability (FGS) layer used for scalable video coding (SVC). The adaptive VLC techniques may adaptively adjust a VLC process to promote reduced complexity and greater efficiency in a digital video encoder.

The adaptive VLC techniques may maintain an end of block (EOB) shift table and VLC codebook selection table as internal states, instead of sending them with coded video slice data. Table entries may be periodically updated based on coding statistics collected during a coding pass. In another aspect, the adaptive VLC techniques may maintain a special EOB (sEOB) shift table that adapts the position of an sEOB symbol in a symbol set to the probability of having nonzero coefficients with magnitude greater than one within the block, and may encode the magnitude information of the nonzero coefficients in separate coding parameters. In an additional aspect, the adaptive VLC techniques may code chroma DC and AC blocks independently of one another, and independently of luma blocks, using separate EOB shift, special EOB shift, and VLC codebook selection tables that are tuned to the chroma DC blocks, chroma AC blocks and luma blocks, respectively.

The disclosure provides, in one aspect, a video coding device comprising a variable length code (VLC) unit configured to perform VLC coding of digital video block coefficients using VLC parameters, collect coding statistics during the VLC coding of the digital video block coefficients, and adjust one or more of the VLC parameters during the VLC coding based on the collected coding statistics.

In another aspect, the disclosure provides a method comprising performing VLC coding of digital video block coefficients using VLC parameters, collecting coding statistics during the VLC coding of the digital video block coefficients, and adjusting one or more of the VLC parameters during the VLC coding based on the collected coding statistics.

In an additional aspect, the disclosure provides a video coding device comprising a variable length code (VLC) unit configured to perform VLC coding of digital video block coefficients using VLC parameters, wherein the VLC parameters comprise a special EOB (sEOB) shift table indicating, for each of a plurality of different coding conditions, an index of an sEOB symbol within a symbol set comprising zero run symbols, an end of block (EOB) symbol, and the sEOB symbol based on a probability of an end-of-block when a block includes one or more nonzero coefficients having a magnitude of greater than one.

In another aspect, the disclosure provides a method comprising generating variable length code (VLC) parameters, and performing VLC coding of digital video block coefficients using the VLC parameters, wherein the VLC parameters comprise a special EOB (sEOB) shift table indicating, for each of a plurality of different coding conditions, an index of an sEOB symbol within a symbol set comprising zero run symbols, an end of block (EOB) symbol, and the sEOB symbol based on a probability of an end-of-block when a block includes one or more nonzero coefficients having a magnitude of greater than one.

The techniques described in this disclosure may be implemented in a hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. Accordingly, this disclosure also contemplates a computer program product comprising a computer-readable medium that comprises instructions to cause a processor to perform any of a variety of techniques as described in this disclosure.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 6 is a diagram illustrating coding nonzero coefficients as runs of zeros in a residual coefficient block.

FIG. 7 is a diagram illustrating cycle-based coding of significant and refinement coefficients in a block associated with an FGS enhancement layer of an SVC slice.

DETAILED DESCRIPTION

Figure 1:
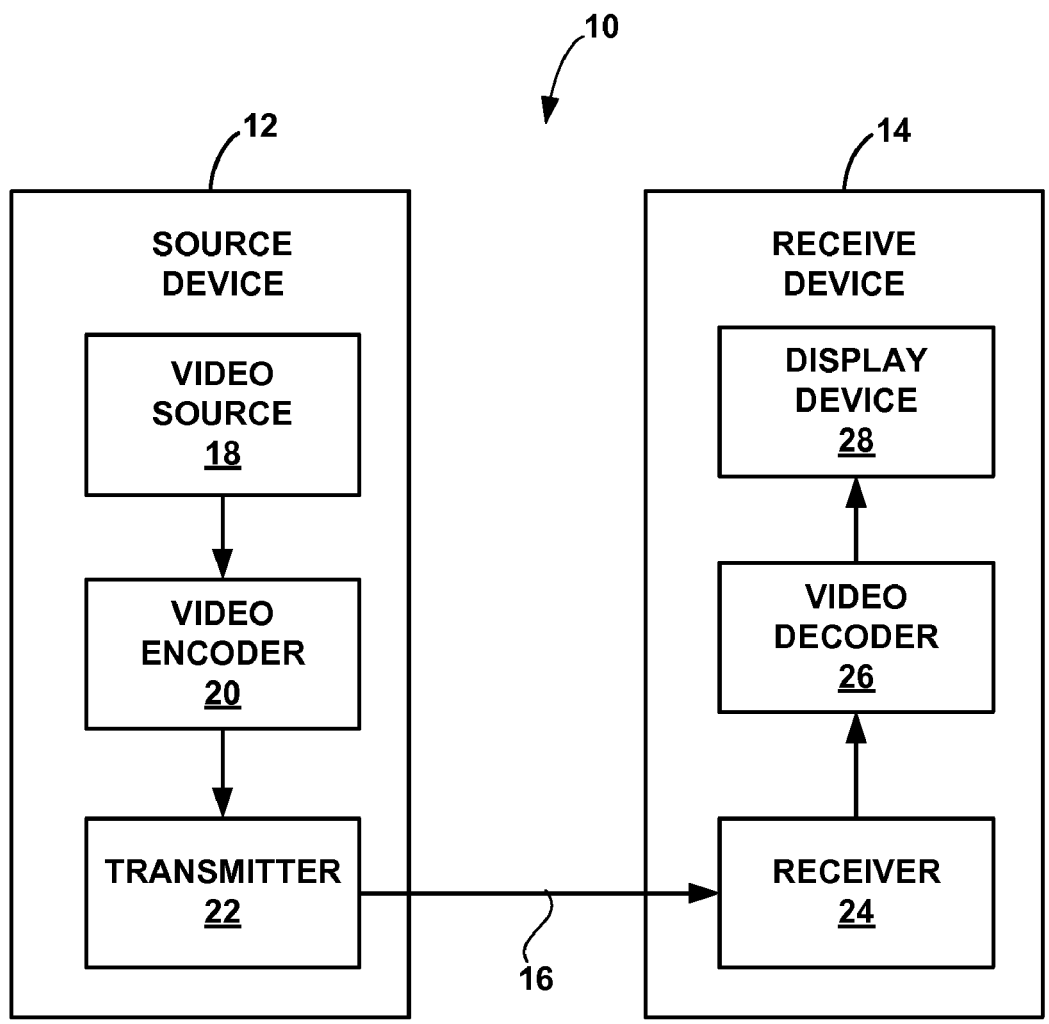
FIG. 1 is a block diagram illustrating a video encoding and decoding system.

FIG. 1 is a block diagram illustrating a video encoding and decoding system 10. As shown in FIG. 1, system 10 includes a source device 12 that transmits encoded video to a receive device 14 via a communication channel 16. Source device 12 may include a video source 18, video encoder 20 and a transmitter 22. Receive device 14 may include a receiver 24, video decoder 26 and video display device 28. System 10 may be configured to apply techniques for adaptive variable length coding (VLC) of digital video. In particular, the adaptive VLC techniques may be used for entropy coding of residual block coefficients produced by a predictive video coding process. The techniques may be applied to video coding schemes that code the positions of nonzero transform coefficients using runs of zeros. As an example, the techniques may be applied to code transform coefficients for significance coding in a fine granularity scalability (FGS) layer used for scalable video coding (SVC). The adaptive VLC techniques applied by system 10 may adaptively adjust a VLC process to promote reduced complexity and greater efficiency in a digital video encoder.

In one aspect, system 10 may be configured to apply adaptive VLC techniques that maintain an end of block (EOB) shift table and VLC codebook selection table as internal states, instead of sending them with coded video slice data. For example, video encoder 20 may periodically update table entries based on statistics collected during a coding pass. In another aspect, video encoder 20 may maintain a special EOB shift table that adapts the position of a special EOB symbol in a symbol set to the probability of significant coefficients with magnitude greater than one under the current coding condition. The special EOB parameter may be represented by two symbols, e.g., sEOB and termSym, as will be described in greater detail below. In an additional aspect, video encoder 20 may code DC and AC chroma blocks independently of luma blocks using separate EOB shift, special EOB shift, and VLC codebook selection tables, e.g., in conjunction with an adaptive VLC scheme.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting diode (OLED) display.

Video encoder 20 and video decoder 26 may be configured to support scalable video coding for spatial, temporal and/or signal-to-noise ratio (SNR) scalability. In some aspects, video encoder 20 and video decoder 22 may be configured to support fine granularity SNR scalability (FGS) coding for SVC. Encoder 20 and decoder 26 may support various degrees of scalability by supporting encoding, transmission and decoding of a base layer and one or more scalable enhancement layers. For scalable video coding, a base layer carries video data with a minimum level of quality. One or more enhancement layers carry additional bitstream to support higher spatial, temporal and/or SNR levels.

Video encoder 20 and video decoder 26 may operate according to a video compression standard, such as MPEG-2, MPEG-4, ITU-T H.263, or ITU-T H.264/MPEG-4 Advanced Video Coding (AVC). Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced video coding for generic audiovisual services, by the ITU-T Study Group, and dated 03/2005, which may be referred to herein as the H.264 standard or H.264 specification, or the H.264/AVC standard or specification.

The Joint Video Team (JVT) continues to work on a scalable video coding (SVC) extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, e.g., in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive device, each of which may be similar to receive device 14 of FIG. 1.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. Each slice may be an independently decodable unit. After prediction, a transform may be performed on the 8×8 residual block or 4×4 residual block, and an additional transform may be applied to the DC coefficients of the 4×4 blocks for chroma components or luma component if the intra_16×16 prediction mode is used.

Figure 2:
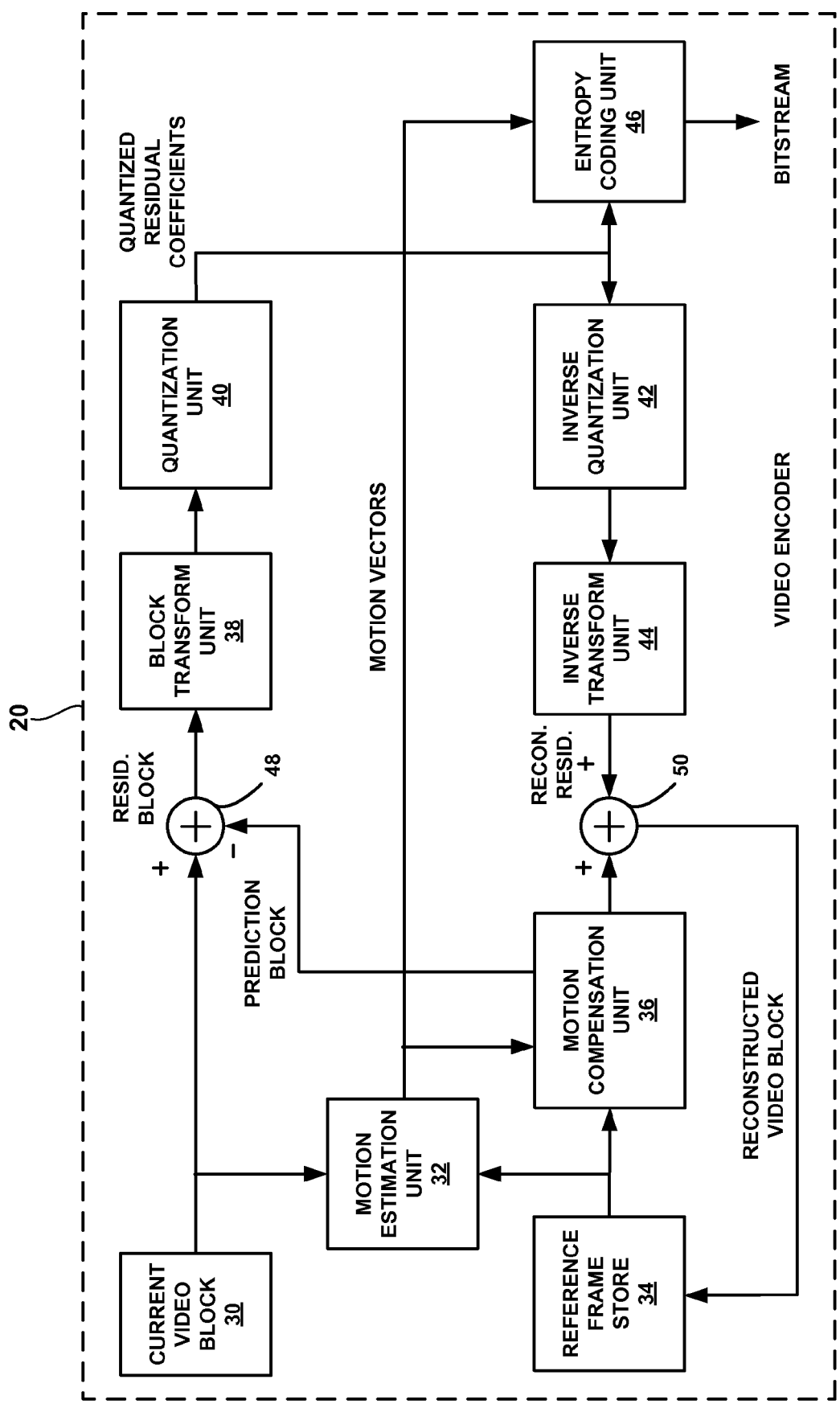
FIG. 2 is a block diagram illustrating an example of a video encoder.

FIG. 2 is a block diagram illustrating an example of a video encoder 20 as shown in FIG. 1. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching video blocks between adjacent frames.

As shown in FIG. 2, video encoder 20 receives a current video block 30 within a video frame to be encoded. In the example of FIG. 2, video encoder 20 includes motion estimation unit 32, reference frame store 34, motion compensation unit 36, block transform unit 38, quantization unit 40, inverse quantization unit 42, inverse transform unit 44 and entropy coding unit 46. An in-loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 32 compares video block 30 to blocks in one or more adjacent video frames to generate one or more motion vectors. The adjacent frame or frames may be retrieved from reference frame store 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 36 forms a prediction video block.

Video encoder 20 forms a residual video block by subtracting the prediction video block produced by motion compensation unit 36 from the original, current video block 30 at summer 48. Block transform unit 38 applies a transform, such as the 4×4 or 8×8 integer transform used in H.264/AVC, to the residual block, producing residual transform block coefficients. Quantization unit 40 quantizes the residual transform block coefficients to further reduce bit rate. Entropy coding unit 46 entropy codes the quantized coefficients to even further reduce bit rate.

Entropy coding unit 46 operates as a variable length coding (VLC) unit to apply VLC coding to the quantized block coefficients. In particular, entropy coding unit 46 may be configured to perform VLC coding of digital video block coefficients using a set of VLC parameters that may be stored as internal states, collect coding statistics during the VLC coding of the digital video block coefficients, and adjust one or more of the VLC parameters during the VLC coding based on the collected coding statistics. In general, video decoder 26 performs inverse operations, including VLC decoding, to decode and reconstruct the encoded video, as will be described, e.g., with reference to FIG. 3.

Inverse quantization unit 42 and inverse transform unit 44 apply inverse quantization and inverse transformation, respectively, to reconstruct the residual block. Summer 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 3:
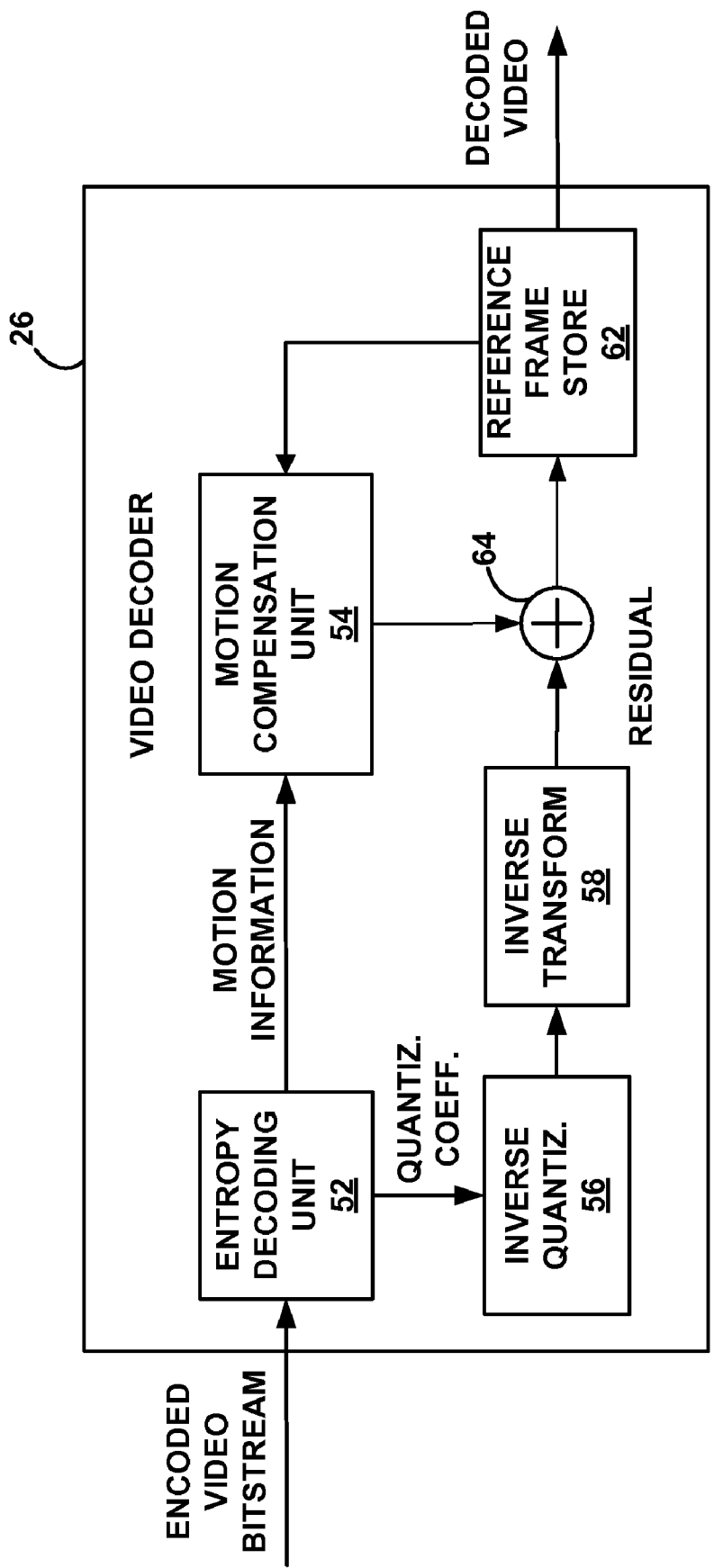
FIG. 3 is a block diagram illustrating an example of a video decoder.

FIG. 3 is a block diagram illustrating an example of a video decoder 26. Video decoder 26 may perform intra- and inter-decoding of blocks within video frames. As shown in FIG. 3, video decoder 26 receives an encoded video bitstream that has been encoded by video encoder 20. In the example of FIG. 3, video decoder 26 includes entropy decoding unit 52, motion compensation unit 54, inverse quantization unit 56, inverse transform unit 58, and reference frame store 62. Video decoder 26 also may include an in-loop deblocking filter (not shown) that filters the output of summer 64. Video decoder 26 also includes summer 64. FIG. 3 illustrates the temporal prediction components of video decoder 26 for inter-decoding of video blocks. Although not shown in FIG. 3, video decoder 26 also may include spatial prediction components for intra-decoding of some video blocks.

Entropy decoding unit 52 receives the encoded video bitstream and decodes from the bitstream quantized residual coefficients, macroblock coding mode and motion information, which may include motion vectors and block partitions. Hence, entropy decoding unit 52 functions as a VLC decoding unit. For example, in order to decode quantized residual coefficients from the encoded bitstream, like entropy encoding unit 46 of FIG. 2, entropy decoding unit 52 of FIG. 3 may perform adaptive VLC decoding of digital video block coefficients as described in this disclosure using a set of VLC parameters that may be stored as internal states, collects coding statistics during the VLC decoding of the digital video block coefficients, and adjusts one or more of the VLC parameters during the VLC decoding based on the collected coding statistics. However, entropy decoding unit 52 performs VLC decoding in an inverse manner relative to entropy encoding unit 46 of FIG. 2 in order to retrieve quantized block coefficients from the encoded bitstream.

Motion compensation unit 54 receives the motion vectors and block partitions and one or more reconstructed reference frames from reference frame store 62 to produce a prediction video block. Inverse quantization unit 56 inverse quantizes, i.e., de-quantizes, the quantized block coefficients. Inverse transform unit 58 applies an inverse transform, e.g., an inverse DCT or an inverse 4×4 or 8×8 integer transform, to the coefficients to produce residual blocks. The prediction video blocks are then summed by summer 64 with the residual blocks to form decoded blocks. A deblocking filter (not shown) may be applied to filter the decoded blocks to remove blocking artifacts. The filtered blocks are then placed in reference frame store 62, which provides reference frame for decoding of subsequent video frames and also produces decoded video to drive display device 28 (FIG. 1).

Currently, the Joint Video Team (JVT), which consists of the video coding experts from ISO/IEC MPEG and ITU-T VCEG, is working on the SVC standard, which is a scalable video coding extension to H.264/AVC. The common software, called JSVM (Joint Scalable Video Model), is being used by the participants. JSVM supports combined scalability. An SVC bitstream can have fine-granularity scalability, spatial scalability, temporal scalability, or any combinations of the three.

Fine granularity scalability is an important and highly desired feature for video coding. This feature allows the compressed video bitstream to be almost arbitrarily truncated, while at the same time providing the end user with graceful degradation of the decoded video quality. In fine granularity scalability (FGS), the enhancement layer bitstream can be arbitrarily truncated. As video decoder 26 receives and decodes more bits in an FGS layer, it will produce better video quality. Moreover, FGS in JSVM has been designed in a way that the improvement in video quality is evenly spread out across the entire video frame, as opposed to being concentrated within only a certain spatial area of the frame, because the latter case will be visually objectionable to the end viewer.

FGS can achieve graceful improvement of video quality using bit-plane coding. If the base or previous layer video frame is quantized using a quantization parameter QP, e.g., with in quantization unit 40 (FIG. 2), then the current enhancement layer video is quantized using quantization parameter around (QP-6), which effectively cuts the quantization step size in half. As a result of lower quantization step size, more residual transform coefficients will become non-zero in the enhancement layer.

The coefficients in the enhancement layer can be generally classified into three types: non-significant coefficients, significant coefficients and refinement coefficients. A non-significant coefficient is a coefficient having a value of zero in the enhancement layer, for which the corresponding coefficient in the base or previous layer is also zero. A significant coefficient is a coefficient that is non-zero in the enhancement layer, but for which the corresponding coefficient in the base or previous layer is zero. A refinement coefficient is a coefficient for which the corresponding coefficient in the base or previous layer is already non-zero (i.e., significant). The values of such non-zero coefficients in the base or previous layer are refined by the values of corresponding coefficients in the current enhancement layer.

Figure 4:
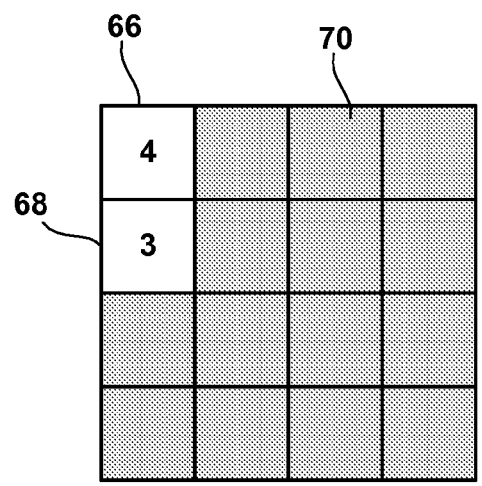
FIG. 4 is a diagram illustrating residual coefficients in a block associated with a base layer of a scalable video coding (SVC) slice.
Figure 5:
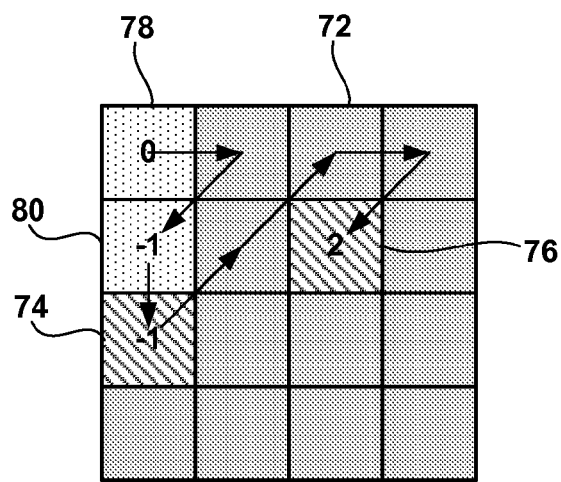
FIG. 5 is a diagram illustrating classification of residual coefficients in a block associated with a fine granularity scalability (FGS) enhancement layer of an SVC slice.

FIG. 4 is a diagram illustrating residual block coefficients in a block associated with a base layer of a scalable video coding (SVC) slice. FIG. 5 is a diagram illustrating classification of residual block coefficients in a block associated with a fine granularity scalability (FGS) enhancement layer of an SVC slice. In the example of FIG. 4, a base or previous layer block includes two non-zero residual transform coefficients 66, 68, and a majority of zero-value residual transform coefficients 70 in gray. In the example of FIG. 5, the FGS layer block includes non-significant coefficients 72 in gray, significant coefficients 74, 76 with cross-hatching and refinement coefficients 78, 80 with a dotted pattern. Refinement coefficients 78, 80 in the FGS block of FIG. 5 correspond to nonzero coefficients 66, 68 in the base or previous layer block of FIG. 4. As shown in FIG. 5, significant coefficients can have a magnitude greater than 1. For example, significant coefficient 76 has a magnitude of 2 in the example of FIG. 5. Note that, although a refinement coefficient, such as refinement coefficient 78 in FIG. 5, may have the value of 0, it may be considered a nonzero coefficient as the corresponding base or previous layer coefficient is nonzero. Therefore, in this disclosure, significant and refinement coefficients are sometimes collectively referred to as nonzero coefficients.

Similar to H.264/AVC, the SVC JD9 also supports two entropy coding modes: the Context-based Adaptive Binary Arithmetic Coding (CABAC) mode and the Context-based Adaptive Variable Length Coding (CAVLC) mode. This disclosure describes adaptive VLC techniques that may be useful for adaptive coding of coefficients in the FGS enhancement layer in the CAVLC mode. Compared to the corresponding scheme defined in SVC JD9, techniques for coding FGS layer coefficients as described in this disclosure can greatly reduce computational complexity within video encoder 20 and/or video decoder 26, while at the same time providing better coding performance.

The adaptive VLC techniques described in this disclosure may not be limited to coding of coefficients in the FGS layer. Rather, such techniques may be applied more generally to any coding system that codes the position of nonzero coefficients using runs of zeros. Examples of such coding systems are a normal single layer video coder, a discrete enhancement layer coder of an SVC coder, or an FGS enhancement layer coder of an SVC coder. In the current SVC Joint Draft, significant coefficients and refinement coefficients in an FGS layer are coded separately using different mechanisms. However, significant coefficients and refinement coefficients may be both coded as runs of zeros, in which case the adaptive VLC techniques described in this disclosure may be applicable to coding of both types of coefficients. Application of the adaptive VLC techniques to code the positions of significant coefficients as runs of zeros in an FGS enhancement layer will be described throughout this disclosure for purposes of illustration, but without limitation to the application of such techniques to other coding systems that code the positions of nonzero coefficients using runs of zeros as described above.

In many coding systems that apply a block-based discrete transform, such as the 8×8 or 4×4 integer transform as used in H.264/AVC, the positions of nonzero coefficients are coded using zero runs. A zero run is the number of consecutive zero coefficients before a nonzero coefficient in a certain scanning order. Hence, a zero run may extend from the beginning of a block to the first nonzero coefficient, between consecutive nonzero coefficients, or between the last nonzero coefficient and the last sub-band position of the block. When video decoder 26 receives the zero runs in a certain pre-defined order, the positions of all of the nonzero coefficients can be decoded using the knowledge of the pre-defined coding order and the values of the zero runs. In coding an FGS layer using VLC in SVC, the positions of the nonzero coefficients may be coded as zero runs. In the current Joint Draft, e.g., JD9, only significant coefficients are coded as zero runs; refinement coefficients are coded separately from significant coefficients using a different mechanism. In this case, the refinement coefficients are excluded in forming a zero run. In other words, refinement coefficients do not count as part of a zero run, but also do not interrupt a zero run.

An end of block (EOB) symbol may be combined with zero runs to form a one-dimensional symbol set. The EOB symbol indicates the end of the block being coded. However, the EOB symbol is not necessarily the last subband position in the video block. Rather, the EOB may occur at any position within the video block and serves to signal that there are no nonzero coefficients after the EOB position. Accordingly, the EOB symbol is sent after the position and sign of the last nonzero coefficient in the block is coded. As will be described, the EOB symbol may be a regular EOB symbol or a special EOB symbol, each of which conveys different information about the nonzero coefficients in the block. The actual variable that is coded using variable length coding (VLC) is the index of a symbol in the symbol set of zero runs and EOB. In this symbol set, a zero run of longer length has a larger index, and the index of the EOB symbol may depend upon certain coding conditions, such as the subband position where the EOB is encountered, as described below. The symbol set is then encoded with VLC techniques that assign shorter codewords to smaller index values.

An EOB shift table may be used to identify the index of the EOB symbol within the symbol set. For example, an EOB shift table may be formulated as EOBshift[ ]={16, 4, 3, 1, 0, . . . }, where [ ] refers to the table index which depends on certain pre-defined coding conditions, such as a current subband position, or a coding cycle. For example, the subband position after the last nonzero coefficient may be used to index the EOB shift table. In this case, under the zigzag scanning order, an EOB symbol is sent after the last nonzero coefficient 76 in FIG. 5 is sent; and the symbol value EOBshift[8]=0 is sent since the subband position after the last nonzero coefficient 76 is 8 under the zigzag scanning order. The probability of an EOB increases as coding proceeds into a part of a block containing higher frequency subbands. Therefore, in order to reflect the increased probability of EOB as the subband position being coded increases, the index value of the EOB symbol in the symbol set decreases. As a result, the EOB shift table may contain monotonically non-increasing entries. Furthermore, the block shown in FIG. 5 contains a nonzero coefficient 76 with a magnitude of 2. In this case, the actual EOB symbol sent may not be indexed from the EOBshift[ ] table. Rather, it may instead be indexed from a special EOB (sEOB) shift table sEOBshift[ ]. This special situation will be explained in greater detail below.

FIG. 6 is a diagram illustrating coding nonzero coefficients as runs of zeros in a residual coefficient block (Block 0). FIG. 7 is a diagram illustrating cycle-based coding of significant and refinement coefficients in another block (Block 1) associated with an FGS enhancement layer of an SVC slice. In FIG. 6, block 0 includes nonzero coefficients 82 and 84, and EOB 86. In FIG. 7, block 1 includes significant coefficients 88, 90, 92, refinement coefficient 94 and EOB 96.

As shown in FIG. 6, the following information is sent to identify the positions of nonzero coefficients in the block: 1) run=0, sign=1 (negative); 2) run=0, sign=0 (positive); and 3)

EOB. As mentioned above, zero runs and EOB, as represented by an entry in the EOB shift table, are combined into a one-dimensional symbol set. The indices of the symbol set are then coded. Coding of the symbol set indices may further depend upon certain coding conditions, such as subband position or coding cycle. As one example, VLC coding may be conditioned upon the subband or cluster of subbands of a block to which the zero run or EOB belongs. As another example of a condition, VLC coding may also be conditioned upon the number of zero runs that have been coded for a block. Coding of indices of the zero run and EOB symbol set may be carried out according to the probability estimation under the current coding condition. Performing conditional probability estimation allows the VLC coder to more accurately track the symbol probabilities and therefore achieve better coding performance.

In the current SVC JD9, significant coefficients in an FGS layer are coded as runs of zeros. Significance coding in SVC is conditioned upon coding cycles. For example, the VLC codebook used to code indices of zero run symbols for significant coefficients depends on the coding cycle to which the significant coefficient belongs. The coding cycle is defined based on two variables: (1) the starting position of the zero run in the zig-zag scanning order, and (2) the number of consecutive refinement coefficients in zig-zag order before the starting position. Details on how to define the coding cycle can be found in SVC JD9. As an example, in FIG. 7, the three significant coefficients 88, 90, 92 belong to coding cycles 0, 1 and 4, respectively. For a given coding cycle, if there are no more significant coefficients in the block, then an EOB (end-of-block) symbol is sent, e.g., as indicated by reference numeral 96 in FIG. 7. In FIG. 7, an EOB symbol is sent for Block 1 in cycle 8. In particular, because the block contains significant coefficient 92 which has a magnitude of 2, a special EOB is sent for Block 1.

In the current SVC JD9, as an example, a total of five different VLC codebooks may be used to code the indices of zero runs and EOB in a symbol set. These VLC codebooks assign shorter code lengths to smaller indices. These VLC codebooks are tuned for different symbol probability distributions. Therefore, different VLC codebooks may be used to code the zero run and EOB symbol set which may have different probability distributions under different coding conditions. The choice of a specific VLC codebook to code the symbol set of zero runs and EOB may be decided using a VLC codebook selection table. Similar to the EOB shift table, a VLC codebook selection table may also be indexed on certain coding conditions. In SVC JD9, the coding cycle to which the current zero run or EOB belongs is used to index into the EOB shift and VLC codebook selection tables.

In an FGS enhancement layer, significant coefficients and refinement coefficients may be coded separately. In this case, in the course of determining the length of a zero run up to the next significant coefficient in a current coding cycle, any refinement coefficients encountered during the course of scanning do not contribute toward the zero run. For example, in the FGS layer block in FIG. 5, the zero run to significant coefficient 74 is 1 instead of 3 because refinement coefficients 78 and 80 are not counted toward the zero run to significant coefficient 74. As previously explained, the significant and the refinement coefficients may be both coded as runs of zeros. However, regardless of whether the significant coefficients and refinement coefficients are coded separately or both as runs of zeros, the adaptive VLC techniques described in this disclosure may be applied.

The magnitude of a nonzero coefficient may be greater than 1. For example, in FIG. 7, the last significant coefficient 92 has a magnitude of 2. In some coding systems, the nonzero coefficient magnitudes that are greater than 1 may not be sent until after an EOB symbol is sent for the block. After the position and the sign of the last nonzero coefficient is coded, a regular EOB symbol conveys the information that no nonzero coefficient in the block has a magnitude greater than 1. If a block contains one or more nonzero coefficients with magnitudes greater than 1, however, instead of using the regular EOB shift table to code the EOB symbol, a special EOB symbol, indexed from a special EOB shift table, may be coded. After the VLC codeword for the special EOB symbol is sent, the positions and magnitudes of those nonzero coefficients with magnitude greater than 1 are coded.

In the current SVC JD9, the special EOB is formed by sEobBase+termSym, where the first term sEobBase is a value that can be differentiated from all the possible zero runs and the regular EOB for the applicable cycle. The value of sEobBase is normally calculated as sEobBase=numRemainingZeros+1. The variable "numRemainingZeros" is the number of coefficients in the zigzag order from the last significant coefficient until the last subband of the block, minus any refinement coefficient in between. The second term termSym is formed in the following way. If S is the total number of significant coefficients in the block, N is the number of coefficients with magnitude greater than 1, and M is the maximum magnitude of such coefficients, the value of termSym is:

$$\begin{aligned}&\text{if}(M<4)\\&\quad \text{termSym}=2*(N-1)+(M\%2)\\&\text{else}\\&\quad \text{termSym}=S*(M-2)+(N-1)\end{aligned} \quad (1)$$

Hence, the value of "termSym" represents the magnitude of the significant coefficients in a special EOB scenario by indicating both the number of significant coefficients having a magnitude of greater than one and the maximum magnitude among those significant coefficients. In the example of FIG. 7, for block 1, sEobBase equals 9, and termSym equals 0. Therefore, instead of sending EOBShift[8] to indicate the end of the block, video encoder 20 would send the special EOB of sEobBase+termSym=9, using the VLC codebook selected for this coding cycle. For example, if the codebook selected for cycle 1 is codebook 0 (unary code), then the special EOB of 9 is sent using 10 bits. According to this scheme, video decoder 26 would easily detect between the regular EOB and the special EOB, because the index of the special EOB is always larger than the index of any possible zero run or that of the regular EOB.

After sending the special EOB, video encoder 20 would send S bits to indicate which of the S significant coefficients in the block have magnitude greater than 1. Video encoder 20 would then encode the "magnitude−2" of each such coefficient using unary code. In the example of block 1 in FIG. 7, 3 bits are sent to identify that the last significant coefficient 92 has magnitude greater than 1, after which no additional information needs to be sent. More details concerning magnitude coding can be found in SVC JD9.

In SVC JD9, the EOB shift table and the codebook selection table, both indexed by the coding cycle, are sent at the beginning of a set of slice data. In order to achieve high coding performance for significance coding, video encoder 20 would parse all blocks in the video slice and collect statistics of the zero runs and EOBs for each coding cycle. Video encoder 20 would then decide the optimal EOB shift table and codebook selection table based on the statistics for each coding cycle. In the actual coding pass, video encoder 20 would send the optimal EOB shift and codebook selection tables in the bitstream and then use them to perform significance coding for the current FGS layer. Hence, to achieve high coding performance, a dedicated pass may be needed to collect statistics and decide optimal coding parameters, e.g., the EOB shift table and codebook selection table, followed by an additional pass to perform coding with the optimal coding parameters. Unfortunately, such a significance coding scheme has a number of shortcomings.

As one example, in an SVC JD9 implementation, encoder complexity may be high by making two passes through the video slice, the first to tally statistics for table generation and the second to perform actual coding using the tables generated. If the encoder skips the first pass of statistics collection, then the coding performance will suffer as the EOB shift table and codebook selection table may not be tuned to the actual statistics of the current video data being encoded. The coding performance loss thus incurred could be high.

As another example, the special EOB coding scheme outlined in SVC JD9 is not efficient. The way the special EOB symbol is formed may generate symbols that are undesirably large. In turn, larger symbols are coded using longer VLC codewords, which may result in a coding penalty, especially for video content in which the number of blocks containing significant coefficients with magnitude greater than 1 is relatively high.

As a further example, coding of chroma coefficients according to the SVC JD9 scheme tends to be inefficient. Like H.264/AVC, in SVC, the chroma coefficients are sent as chroma DC and chroma AC. In coding of chroma DC and AC significant coefficients, only one 16-entry EOB shift table for chroma is included in the FGS layer bitstream. This EOB shift table is used to code both the chroma DC and AC coefficients. However, chroma DC and AC coefficients have different statistics. For example, 4 coding cycles are needed for chroma DC compared to 15 coding cycles for chroma AC. Consequently, sharing one common EOB shift table between chroma DC and AC is not efficient. Furthermore, no separate codebook selection table is provided in the bitstream for the coding of chroma DC and AC. Instead, in SVC JD9, luma, chroma DC, and chroma AC all use the same codebook selection table. Sharing the same codebook selection table also leads to reduced coding performance because luma, chroma DC and AC coefficients all have different statistics.

In accordance with this disclosure, video encoder 20 may be configured to implement adaptive VLC techniques. In some aspects of this disclosure, the adaptive VLC techniques may be formulated to overcome one or more of the disadvantages associated with the existing SVC JD9 implementation outlined above. Moreover, the adaptive VLC techniques as outlined in this disclosure provide a general VLC coding framework that may be applied to any single layer or multiple layer video coder that codes block coefficients as runs of zeros. Accordingly, such techniques are not necessarily limited to SVC.

For example, entropy coding unit 46 of video encoder 20 may be configured to dynamically determine optimal coding parameters, such as EOB shift, special EOB shift, and codebook selection tables, based on statistics collected during a coding pass. The statistics may include, for example, zero run, EOB, and sEOB counts over the course of coding a video slice. Entropy coding unit 46 applies an adaptive VLC scheme that reduces encoder complexity while maintaining a high level of coding performance. In the adaptive VLC scheme, entropy coding unit 46 does not explicitly send EOB shift, special EOB shift, and codebook selection tables as parts of the coded bitstream. Instead, the EOB shift, special EOB shift and codebook selection tables are internal states maintained within both video encoder 20 and video decoder 26.

Entropy coding unit 46 updates the internal states within video encoder 20 based on statistics accumulated during a coding pass. Similarly, entropy decoding unit 52 updates the internal states within video decoder 26 based on statistics accumulated during a decoding pass. The collection of statistics and adjustment of coding parameters can be performed while coding or decoding of the video slice progresses. In this manner, the EOB shift, special EOB shift, and codebook selection tables dynamically adapt to statistics of coefficients in the current video slice, eliminating the need for sending these tables in the bitstream and also eliminating the need to generate these tables at the encoder via a separate coding pass dedicated to collection of statistics.

Instead of sending the coding parameter tables as part of the video slice data, the adaptive VLC scheme implemented by video encoder 20 and video decoder 26 maintains these tables as internal states and updates the table entries based on the accumulated statistics in a video slice. Maintenance and updating of the internal states during coding of a video slice permits video encoder 20 to eliminate the first coding pass that collects the statistics to decide optimal coding parameter tables without significant coding performance penalty. In addition, in the case of an FGS layer of an SVC slice, because no tables need to be sent by video encoder 20 at the beginning of the slice, the adaptive VLC scheme also may increase the rising slope at the start of the rate-distortion curve in a bitstream truncation scenario. Entropy decoding unit 52 of video decoder 26 may apply the same techniques used by entropy encoding unit 46 of video encoder 20 to support adaptive VLC at the decoder side.

Another refinement to entropy coding unit 46, in accordance with an aspect of this disclosure, may involve coding a special EOB in two symbols as sEOB and termSym, instead of as a combined sEOB symbol (sEOB=sEobBase+termSym) as used in the SVC JD9. In particular, an sEOB symbol, which indicates the event that at least one nonzero coefficient in the block has magnitude greater than 1, may be introduced as a separate symbol in the symbol set that contains the zero runs and regular EOB. The index of the sEOB symbol in the combined symbol set may be determined by entropy coding unit 46 (or entropy decoding unit 52) based on the probability estimation of special EOBs under the current coding condition, such as in the current coding cycle. After the special EOB symbol is coded, magnitude information for those coefficients with magnitudes larger than one is sent. For coding of the magnitudes, a scheme similar to the use of "termSym" as in SVC JD9 may be used.

Alternatively, other schemes that provide better coding performance may be used. If a scheme as described in SVC JD9 is used, then the value of "termSym" may be coded separately by video encoder 20 using a fixed VLC codebook. A special EOB shift table may be maintained in video encoder 20 to capture the probability of blocks containing nonzero coefficients with magnitude greater than 1. The special EOB shift table may be indexed on certain coding conditions. Similar coding conditions used to index the EOB shift table, such as the subband position where the special EOB occurs, or the coding cycle as defined in SVC JD9, may be used to index the special EOB shift table. Entropy coding unit 46 of video encoder 20 adapts the index of the special EOB symbol in the combined zero run and EOB symbol set to the actual probability of blocks containing nonzero coefficients with magnitudes larger than 1. Entropy decoding unit 52 of video decoder 26 detects the event of special EOB when it decodes from the bitstream a symbol that is equal to the index of the special EOB symbol under the current coding condition, and updates the statistics of the special EOB accordingly to stay in synchronization with the entropy coding unit 46.

As a further refinement, entropy coding unit 46 of video encoder 20 may be configured to apply separate EOB shift, special EOB shift, and codebook selection tables to code the chroma DC and AC coefficients. An adaptive coding scheme may also be used, in which case such tables may be maintained as internal states that are dynamically adjusted based on statistics collected during a coding pass, e.g., as described above. In this manner, video encoder 20 can separate coding of the chroma DC and AC blocks. In addition, chroma DC and AC blocks may be coded separately from luma blocks. As a result, both chroma DC and chroma AC coefficients have separate EOB shift, special EOB shift, and codebook selection tables tuned toward their own statistics. These table entries may be adapted according to the accumulated statistics from the coding pass. Alternatively, some table entries, e.g., tables associated with chroma DC, may not be adapted to reduce memory requirement and updating operations. Instead, tables for chroma DC and/or chroma AC may be preselected as fixed tables, and not updated during coding.

Entropy decoding unit 52 of video decoder 26 may apply similar techniques to support the use of separate EOB shift, special EOB shift, and codebook selection tables for chroma DC and AC coefficients. In each case, a VLC unit realized by entropy coding unit 46 or entropy decoding unit 52 may be configured to perform VLC coding of chroma DC and AC blocks separately from one another. In particular, the VLC unit may be configured to adjust the EOB shift, special EOB shift, and codebook selection tables for the chroma DC and AC blocks separately based on coding statistics collected separately for the chroma DC and AC blocks. The VLC unit also may code luma blocks separately from chroma DC and AC blocks.

In this disclosure, examples of details regarding how to initialize VLC coding parameters as internal states for luma, chroma DC and chroma AC, when and how to update coding parameters, and how to normalize accumulated statistics are also presented. Examples of details regarding how to reduce the memory required by internal states, and how to reduce the number of updating operations, are also presented. In general, VLC coding comprises coding positions of nonzero block coefficients within a block as zero runs using VLC parameters.

For SVC, when digital video block coefficients represent block coefficients in an enhancement layer of a scalable video coding (SVC) slice comprising the enhancement layer and at least one base or previous layer, coding positions of nonzero block coefficients within a block may comprise coding only positions of significant coefficients. The significant coefficients in the enhancement layer are coefficients that are non-zero in the enhancement layer for which corresponding coefficients in the base or previous layer are zero. Alternatively, positions of both the refinement and significant coefficients in an FGS video block of a SVC slice may be coded as runs of zeros, thereby reducing the system complexity of applying a separate coding mechanism for refinement coefficients. As described in this disclosure, however, the adaptive scheme may be applicable not only to significance coding in an FGS layer in SVC, but also to any other video coding scheme that codes the position of nonzero transform coefficients using runs of zeros. Furthermore, the adaptive VLC scheme as described in this disclosure may be applicable to refinement coefficient coding if the refinement coefficients in an FGS layer are also coded as runs of zero.

Figure 8:
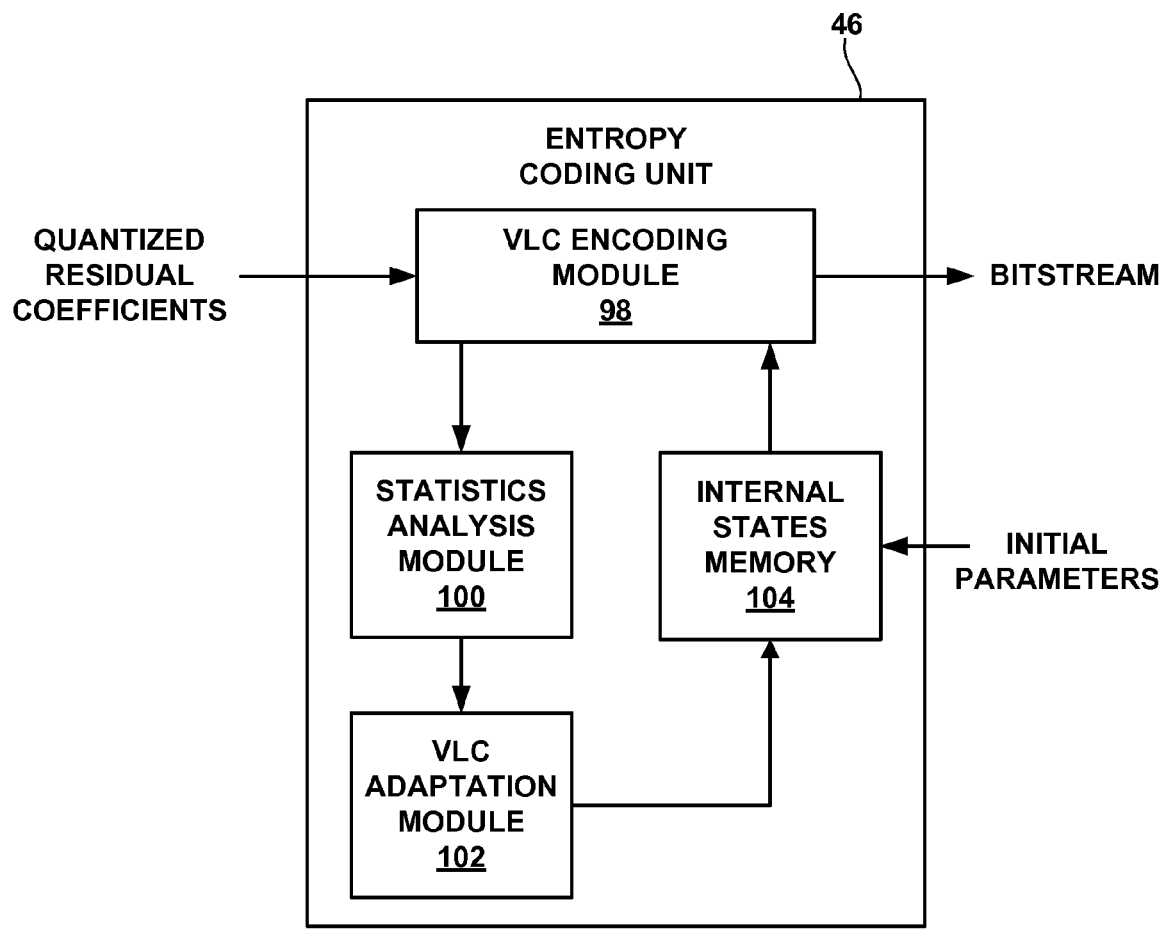
FIG. 8 is a block diagram of an entropy encoding unit configured to apply an adaptive VLC process in accordance with an aspect of the disclosure.

FIG. 8 is a block diagram of an entropy encoding unit 46 configured to apply an adaptive VLC process in accordance with an aspect of the disclosure. Entropy encoding unit 46 may reside within video encoder 20 of FIGS. 1 and 2. As shown in FIG. 8, entropy encoding unit 46 receives quantized residual block coefficients, e.g., from quantization unit 40 (FIG. 2), and generates an entropy coded bitstream for transmission to another device for decoding. In the example of FIG. 8, entropy encoding unit 46 includes VLC encoding module 98, statistics analysis module 100, VLC adaptation module 102 and internal states memory 104. In operation, VLC encoding module 98 does not require a dedicated statistics collection pass through the quantized residual coefficients in order to select EOB shift, special EOB shift, and codebook selection tables in order to achieve high coding performance. Instead, the EOB shift, special EOB shift, and codebook selection tables are maintained as internal states within internal states memory 104. The internal states in internal states memory 104 may be initialized for each video slice and then adjusted throughout coding of a video slice based on statistics collected by statistics analysis module 100. For example, VLC coding parameters may be initialized by entropy coding unit 46 at the start of a slice comprising digital video coefficient blocks. Then, entropy coding unit 46 adjusts the VLC parameters at selected intervals within the slice. The intervals may be regular or irregular. As one example, the VLC parameters may be adjusted at boundaries of blocks within the slice, such as boundaries of 4×4 blocks, 8×8 blocks, or 16×16 macroblocks. The VLC parameters may then be re-initialized for each new video slice to be coded. As an alternative, the VLC parameters may be re-initialized for each new frame, which may include multiple slices.

Upon initialization, a particular EOB shift table, special EOB shift table, and codebook selection table may be selected as a default. The default may be determined arbitrarily or based on empirical analysis of typical video data slices handled by entropy coding unit 46. Then, in response to coding statistics collected by statistics analysis module 100, such as zero runs, EOB counts and sEOB counts, VLC adaptation module 102 may adjust the EOB shift table, special EOB shift table and codebook selection table entries to adaptively respond to the statistics of the data being coded. Hence, VLC adaptation module 102 may adapt coding parameters by adjusting the table entries in internal states memory 104 based on limited statistics accumulated over the course of a single coding pass, rather than full statistics that would require a separate coding pass. VLC encoding module 98 references the contents of internal states memory 104 to obtain the relevant entries under the current coding condition of the EOB shift, special EOB shift and codebook selection tables needed for VLC coding of the incoming quantized residual coefficients. Using the relevant coding parameters of internal states memory 104, VLC encoding module 98 produces the encoded video bitstream.

Hence, the VLC coding parameters may comprise, for each of the coding conditions tracked, an EOB shift indicating an index of an EOB symbol within a symbol set comprising zero run symbols, the EOB symbol, and the special EOB symbol based on a probability of an end-of-block in the respective coding condition, and a VLC codebook indicating a codebook used to code indices of the symbols in the symbol set for the respective coding condition. As an example, the coding condition may be a subband position or a coding cycle. The VLC codebook for a certain coding condition may be selected from one of a plurality of different VLC codebooks, such as one of the five VLC codebooks specified in SVC JD9. In addition, the VLC coding parameters may comprise, for each of the coding conditions tracked, a special EOB (sEOB) shift indicating an index of an sEOB symbol within a symbol set comprising zero run symbols, the EOB symbol, and the sEOB symbol based on a probability of an end-of-block in the respective coding condition when at least one of the nonzero coefficients in a video block has a magnitude of greater than one.

Figure 9:
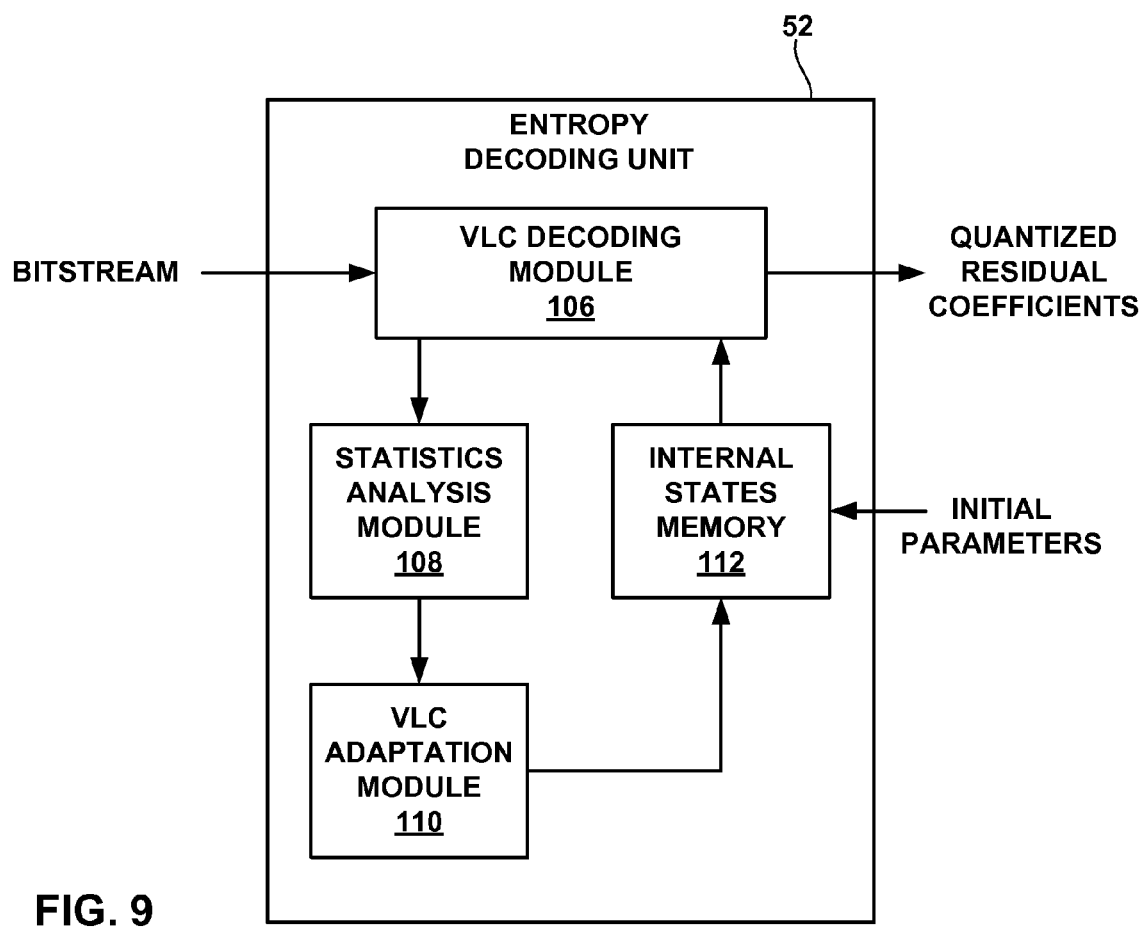
FIG. 9 is a block diagram of an entropy decoding unit configured to apply an adaptive VLC process in accordance with an aspect of the disclosure.

FIG. 9 is a block diagram of an entropy decoding unit 52 configured to apply an adaptive VLC process in accordance with an aspect of the disclosure. Entropy decoding unit 52 may reside within video decoder 26 of FIGS. 1 and 3. As shown in FIG. 9, entropy decoding unit 46 receives an encoded video bitstream, e.g., from source device 12 via channel 16 (FIG. 1), and entropy decodes the bitstream to produce quantized residual coefficients. In the example of FIG. 9, entropy decoding unit 52 includes VLC decoding module 106, statistics analysis module 108, VLC adaptation module 110 and internal states memory 112.

In operation, VLC decoding module 106 does not decode EOB shift, special EOB shift and codebook selection tables from the bitstream. Instead, as with entropy encoding unit 46 of FIG. 8, the EOB shift, special EOB shift and codebook selection tables for entropy decoding unit 52 may be maintained as internal states within internal states memory 112. For example, for adaptive VLC, both the encoder 20 and decoder 26 may maintain the following internal states for a particular video slice:

a. The accumulated statistics of the zero runs, EOBs, and special EOBs;
b. The EOB shift table, indexed by certain coding conditions;
c. The special EOB shift table, indexed by certain coding conditions; and
d. The codebook selection table, indexed by certain coding conditions Hence, encoder 20 and decoder 26 may collect coding statistics including accumulated counts of zero runs, EOB symbols, and sEOB symbols in different coding conditions, such as the coding subband position or coding cycle, over the course of a coded slice. The internal states in internal states memory 104 in video encoder 20 and the internal states in internal states memory 112 in video decoder 26 may be initialized to the same default settings for each video slice. The internal states memory 104 and the internal state memory 112 are adjusted in the same way throughout coding and decoding of the slice based on statistics collected by statistics analysis module 100 in video encoder 20 and statistics analysis module 108 in video decoder 26, respectively.

In response to collection of statistics by statistics analysis module 108, VLC adaptation module 110 may adjust the EOB shift table, sEOB shift table, and codebook selection table entries to adaptively respond to the statistics of the data being decoded by VLC decoding module 106. Like VLC adaptation module 102 of entropy coding unit 46, VLC adaptation module 110 of entropy decoding unit 52 may adapt the table entries in internal states memory 112 based on limited statistics accumulated over the course of decoding the current video slice. VLC decoding module 106 references the contents of internal states memory 112 to obtain the EOB shift, sEOB shift and codebook selection tables needed for VLC decoding of the incoming bitstream, and generates quantized residual coefficients as output for the remainder of decoder 26.

Figure 10:
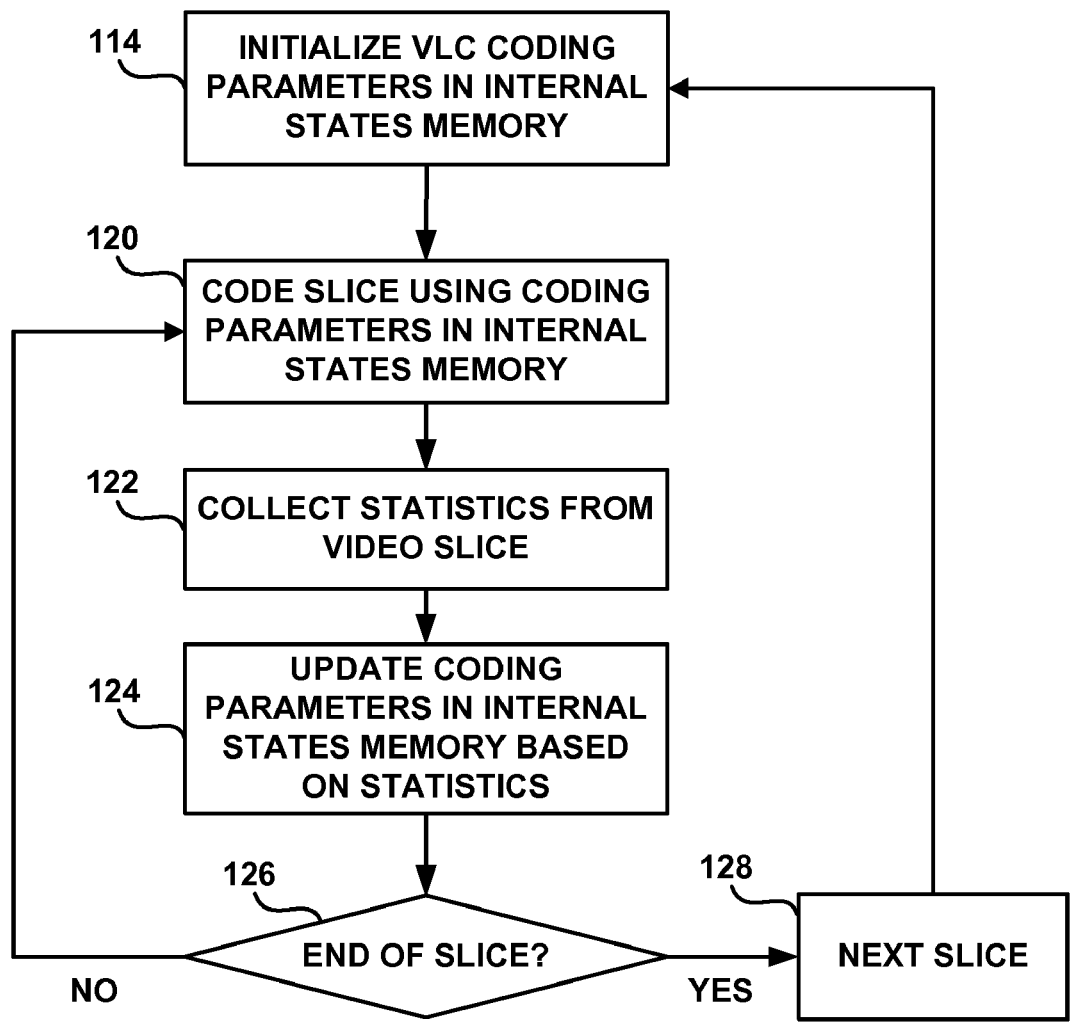
FIG. 10 is a flow diagram illustrating an adaptive VLC process in accordance with an aspect of the disclosure.

FIG. 10 is a flow diagram illustrating an adaptive VLC process in accordance with an aspect of the disclosure. In general, the process of initializing the internal states memory 114, collecting statistics from the video slice 122, and updating the internal states memory 124, as illustrated by FIG. 10, may be implemented within video encoder 20, video decoder 26 or both. Application of the adaptive VLC process within video encoder 20 and, more particularly, entropy coding unit 46, will be described for purposes of illustration. As shown in FIG. 10, at the start of a new video slice, entropy coding unit 46 initializes the VLC coding parameters in the internal states memory to the applicable default values (114). The default values may be selected based on empirical data, historical data, or theoretical assumptions, e.g., to place the VLC coding parameters at typical values associated with a typical video slice. Coding parameters stored in the internal states memory may include coding tables such as the EOB shift table, special EOB shift table, and the codebook selection table. Entropy coding unit 46 then performs coding of the residual coefficient blocks within the slice (120) using the coding tables stored in the internal states memory. When coding the nonzero coefficients, appropriate entries from the coding tables are selected based on the current coding condition, such as the current subband position or current coding cycle to which the zero run symbol, EOB symbol or sEOB symbol belongs.

During coding of the slice, entropy coding unit 46 collects actual statistics from the video data being coded (122). The actual statistics may indicate actual counts of zero run lengths, EOB counts, and sEOB counts present in the blocks that have been coded. Entropy coding unit 46 updates the internal states based on the collected statistics (124), thereby adapting the EOB shift table, the special EOB shift table, and the codebook selection table to the actual data that is being coded. Again, the adjustment of coding parameters in the internal states memory may be applied at block boundaries, such as at the boundaries of 4×4 blocks, 8×8 blocks, or 16×16 MBs. Entropy coding unit 46 continues to code the blocks within the current slice using the updated coding parameters (120). Upon reaching the end of the slice (126), entropy coding unit 46 proceeds to the next slice (128) and re-initializes the coding parameters (114) to the default values.

Entropy decoding unit 52 may operate in a similar, but inverted, manner to entropy decode an incoming, encoded video bitstream. In particular, the entropy decoding unit 52 follows the same initialization and updating processes of the internal states memory in order to stay in synchronization with the entropy encoding unit 46. Accordingly, consistent with this disclosure, entropy encoding unit 46 and entropy decoding unit 52 may be configured to perform variable length coding of digital video block coefficients using VLC parameters, and collect coding statistics during the VLC coding of the digital video block coefficients. Based on the collected coding statistics, entropy encoding unit 46 and entropy decoding unit 52 may adjust one or more of the VLC parameters during the VLC coding based on the collected statistics. In this manner, adaptive VLC coding can be provided.

Figure 11:
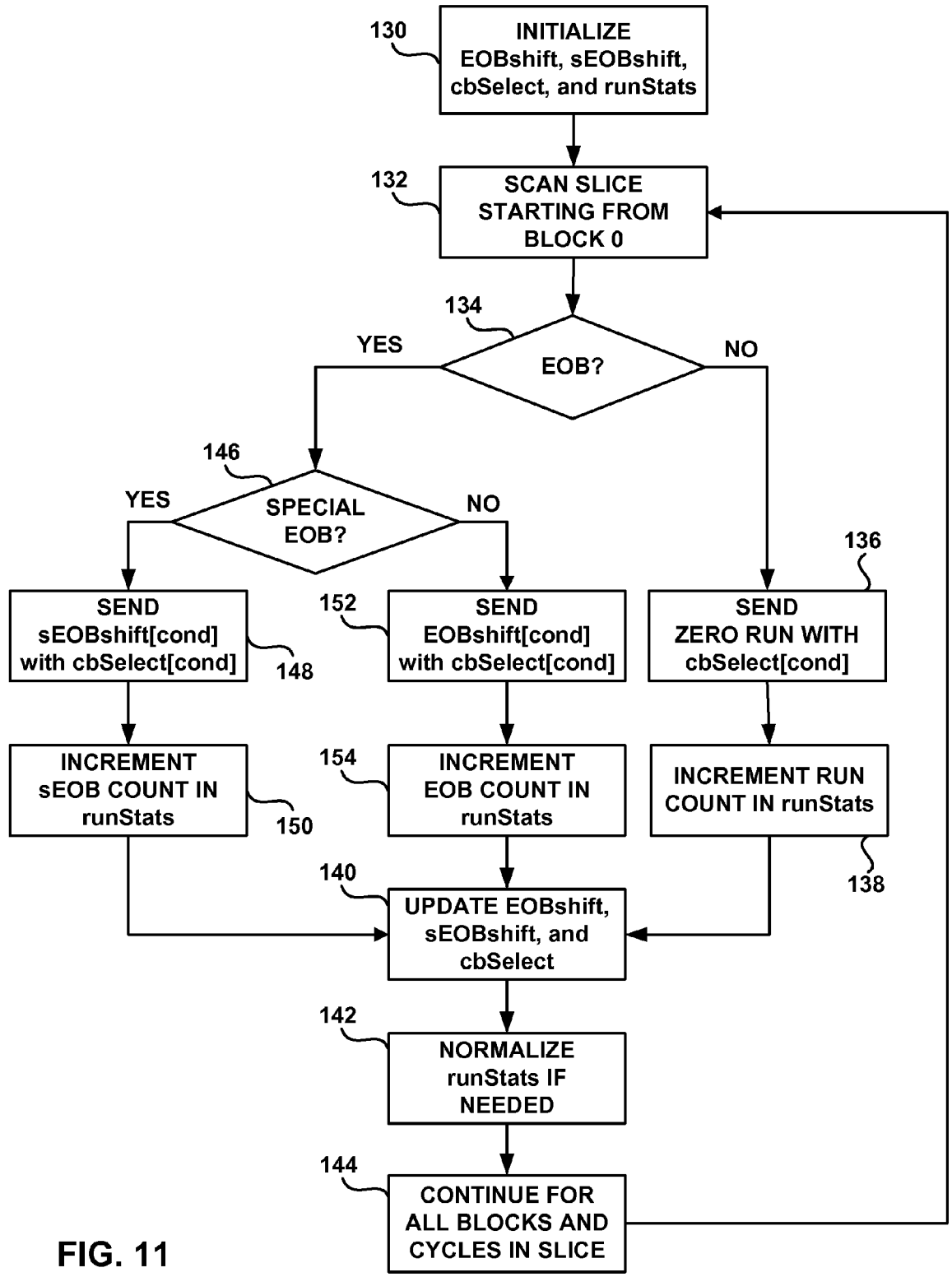
FIG. 11 is a flow diagram illustrating an adaptive VLC process in greater detail.

FIG. 11 is a flow diagram illustrating an adaptive VLC process in greater detail. In general, the adaptive VLC process may be applied by video encoder 20, video decoder 26, or both, e.g., in a reciprocal manner. Application of the adaptive VLC process within video encoder 20 and, more particularly, entropy coding unit 46, will be described for purposes of illustration. As shown in FIG. 11, at the start of a video slice, video encoder 20 initializes coding parameters and statistics in internal state memory (130). The coding parameters and statistics may include an EOB shift (EOBshift) table, special EOB shift (sEOBshift) table, codebook selection (cbSelect) table, and an array used to store statistics of the zero runs, EOB and sEOB (runStats). Video encoder 20 then scans the slice starting from subband 0, block 0 (132). If the current block does not indicate an end of block (EOB) (134), video encoder 20 sends the zero run with the codebook selected from the table cbSelect under the current coding condition (136), and increments the zero run count in the array runStats (138). Video encoder 20 then proceeds to update the EOBshift, sEOBshift and cbSelect parameters (140) based on the contents of the array runStats. Video encoder 20 may also normalize the contents of runStats if needed (142). Normalization may be desirable to avoid counter overflow and to better adapt to local statistics. Video encoder 20 continues the process for all blocks in the slice (144).

If an EOB is detected for the current block (134), video encoder 20 determines whether the EOB is a special EOB (146). If so, video encoder 20 sends the special EOB symbol indexed from the table sEOBshift under the current coding condition (sEOBshift[cond]) (148), and increments the special EOB count (sEOB COUNT) within the array runStats (150). Alternatively, if the detected EOB (134) is a regular EOB, and not a special EOB, video encoder 20 sends the regular EOB symbol indexed from the table EOBshift under the current coding condition (EOBshift[cond]) (152), and increments the regular EOB count (EOB COUNT) in the array runStats (154). In either case (sEOB or EOB), video encoder 20 proceeds to update the EOBshift, sEOBshift and cbSelect parameters (140) based on the contents of the array runStats, and normalize the contents of runStats if needed (142). Video encoder 20 then continues the process for all blocks in the slice (144). At the end of a slice, video encoder 20 may re-initialize the EOBshift, sEOBshift, and cbSelect parameters, as well as the runStats array, for coding of the next slice.

In the case of an FGS layer in an SVC slice, video encoder 20 sends all coefficients in the enhancement layer in the order of coding cycles, as set forth in SVC JD9. Therefore, the coding condition used to index into the tables EOBshift, sEOBshift, and cbSelect is the current coding cycle as defined in the SVC JD9. As shown in FIG. 11, within each coding cycle, video encoder 26 scans all of the blocks in the slice and sends zero runs of all of the significant coefficients, EOB, and special EOB symbols belonging to the current coding cycle. If the vector mode is used, video encoder 26 may scan all blocks and send zero runs of significant coefficients, EOB, and special EOB symbols for multiple coding cycles. The vector mode, e.g., as supported in SVC JD9, causes video encoder 20 to process a block for multiple coding cycles until it reaches a preset scanning position before it moves to the next block. The adaptive VLC techniques described in this disclosure may be applied independently of the specific coding order used to code the video data, or, more specifically, regardless of whether vector mode is used.

For the purpose of illustration, it is assumed that the vector mode is not used. Upon scanning all of the blocks in the slice and sending all of the significant coefficients, EOB, and special EOB symbols belonging to the current coding cycle, video encoder 20 then moves on to the next coding cycle. In the next coding cycle, video encoder 26 scans all blocks in the video slice again, starting from the first block in the video slice. This cycle based coding process is continued until all coding cycles (e.g., 16 cycles in the case of 4×4 luma coefficient blocks) are finished. Video encoder 20 stores, in the array runStats, the accumulated counts of symbols such as zero runs, EOB and special EOB in different coding cycles. The EOBshift and sEOBshift tables specify which symbols are used to represent EOB and special EOB in a given coding cycle, respectively. The codebook selection (cbSelect) table identifies which codebook is used to code the indices of these symbols in each cycle.

During encoding of zero runs, special EOB, and EOB, video encoder 20 updates the array runStats accordingly. The EOBshift table, sEOBshift table and cbSelect table are updated according to the accumulated statistics stored in runStats. The updating may occur periodically. For example, the update may happen at the boundary of a 4×4 block, an 8×8 block, a macroblock, or anywhere in the video slice. The more frequent the update operation is, the higher the complexity is. As one example, video encoder 20 could be configured to perform the update operation after each macroblock is coded. In this case, the coding parameters EOBshift table, sEOBshift table and cbSelect table may be updated on an MB-by-MB basis.

Video decoder 26 uses the same, adaptive coding scheme to stay in synchronization with video encoder 20. In particular, video decoder 26 initializes coding parameters and statistics in the internal state memory such as EOBshift, sEOBshift, cbSelect, and runStats for each video slice in substantially the same way as video encoder 20. During decoding, video decoder 26 decodes zero runs, EOB, and sEOB symbols from the bitstream, and updates the array runStats accordingly based on symbols decoded from the bitstream. At the same positions of table updates in video encoder 20, the values of EOBshift, sEOBshift, and cbSelect are updated by video decoder 26 according to the array runStats. Both encoder 20 and decoder 26 may also normalize the values in the array runStats. As mentioned previously, advantages of performing normalization include avoidance of counter overflow and better adaptation to local statistics.

Adaptive VLC techniques, as described in this disclosure, may have broader applications than significance coding in the FGS layer in SVC. In particular, adaptive VLC may be generally useful for any video coding scheme that codes the position of nonzero coefficients as runs of zeros. The adaptive VLC techniques also may be applied in a coding system that follows any coding order that may be different from the cycle based coding order as used in the FGS layer in SVC. After transform and quantization, video encoder 20 may scan through the quantized coefficients in the block and send the runs of zeros to indicate the position of the nonzero coefficients, followed by the signs of the non-zero coefficients. The magnitude information for the non-zero coefficients may or may not be grouped together and sent at the end of the block. If the magnitudes are grouped and sent after the end of the block, then the concept of using special EOB presented in this disclosure may also be applied to improve coding performance. For example, VLC coding may comprise coding magnitude information of coefficients within a block having magnitudes greater than one after an end-of-block symbol is coded, and using a special end-of-block symbol to indicate presence of coefficients having magnitudes greater than one within the block. In such a video coding scheme, video encoder 20 may apply the adaptive coding scheme described herein to reduce complexity while maintaining high coding performance.

In addition, the concepts of separating a special EOB shift from "termSym" and making it variable instead of being directly tied to sEobBase may be useful in the current SVC framework in which the video encoder sends the coding tables within a video slice bitstream. In this framework, during the first pass when coding statistics are tallied and coding tables are decided, the encoder tallies the statistics of special EOB along with statistics of zero runs and regular EOB, decides the special EOB shift table and sends the special EOB shift table in the bitstream along with the EOB shift table and codebook selection table. This pre-determined special EOB shift table may then be used during the second coding pass when the video slice is coded.

Set forth below are various examples illustrating implementation details for processing of luma coefficients in 4×4 and 8×8 transform blocks, and processing of chroma DC and chroma AC coefficients, within the framework of coding an FGS layer in an SVC slice. Note that the adaptive VLC techniques may be applied in other coding systems as described earlier. Also note that these examples are not meant to limit the scope of this disclosure. Accordingly, modifications to the details presented below should not be considered to be deviations from this disclosure.

An example of the coding of 4×4 luma blocks will be described. In this example, coding cycle, as used in SVC FGS coding, is assumed to be the coding condition used to index into the coding tables such as EOBshift, sEOBshift and cbSelect, and to index into the coding statistics array runStats. However, coding cycle is used as an example for the purpose of illustration; other coding conditions may be used in place of coding cycle. For coding of 4×4 luma blocks, if the accumulated statistics for all symbols in all 16 coding cycles are to be stored, the array runStats needs a total of 166 entries. Except for coding cycle 0, which has 16 possible runs and thus needs a 16-entry symbol set, all subsequent coding cycles c (c=1 . . . 15) have (16-c) possible runs and two additional symbols for EOB and sEOB and thus needs a (18-c)-entry symbol set. To maintain and update such a large number of coding states entails high complexity for both the encoder 20 and the decoder 26. Accordingly, it may be desirable to reduce the size of the runStats array. Example techniques for reducing the size of the runStats array, updating the EOBshift, sEOBshift, and cbSelect tables, and normalizing the runStats array are described below. It should be noted that these specifics are given as examples, and should not be considered limiting of this disclosure.

An example of a technique for reduction of states maintained in the runStats array will now be described. In the FGS layer, the symbol statistics of the later coding cycles vary less than the statistics of the earlier coding cycles. In the later coding cycles, the probability of the EOB symbol usually becomes higher than the remaining symbols in the symbol set. Therefore, EOBshift[c]=0 is usually the case for coding cycle c≧C. For special EOB, the symbol (16-c) may be used. As the coding cycle number c increases, the value of (16-c) decreases, reducing the coding penalty incurred by this simplification. Also, the statistics of the symbol set of runs/EOB/sEOB at later coding cycles are usually more biased. Thus, for coding cycles c≧C, the unary code (e.g., codebook 0 in SVC JD9) is the most frequently used codebook. Based on these observations, one simplification that may be made to the runStats array is to not maintain symbol statistics for all coding cycles c≧C.

Therefore, collecting coding statistics may comprise collecting the accumulated counts of zero runs, EOB symbols and sEOB symbols only for coding cycles with numbers less than C, and not collecting the accumulated counts of zero runs, EOB symbols and sEOB symbols for coding cycles with numbers greater than or equal to C, wherein C is less than a maximum number of the coding cycles. As one example, C=10 may be chosen as the cycle cutoff threshold although any other number may also be used. If C=10, then statistics are collected only for cycles 0 through 9, and are not collected for cycles 10 and above.

For earlier coding cycles (c<C), the probability of larger runs is relatively small, making them less important when deciding the optimal codebook for the respective coding cycle. Therefore, for earlier coding cycles c<C, the array runStats may only maintain the probability counts of smaller zero runs having length s<S. All larger symbols having lengths s≧S may be treated as one symbol such that the runStats array need only maintain the total count of all such symbols. Therefore, collecting coding statistics may comprise, for each coding cycle c<C, collecting the accumulated counts of zero runs for each of the zero runs having lengths less than S on an individual basis, and collecting a combined count of zero runs for the zero runs having lengths greater than or equal to S on a combined basis, wherein S is less than a maximum value of zero runs in the current coding cycle. As these probability counts are sufficient for deciding a good codebook and proper EOB shift and special EOB shift for each coding cycle c<C, this simplification made to the runStats array incurs minimal coding performance loss.

As an example, for coding cycle c=0, the runStats array only maintains counts of 3 zero runs (run=0, 1, 2), plus one total count for all remaining runs. For all other coding cycles c>0, but c<C (e.g., C=10), the runStats array only maintains statistics of EOB, special EOB, and 3 zero runs (run length=0, 1, or 2), plus one total count for all remaining run values. In other words, the value of S is 3 for coding cycle c<C. Statistics of all cycles c≧C, e.g., C=10, are not maintained. Thus, the coding cycle 0 needs 4 entries in runStats, and all other coding cycles 1 through 9 need 6 entries each in runStats. The total number of states maintained in runStats is 4+6*9=58. To summarize, for the example of C=10 and S=3, the statistics to be maintained in runStats may be the following:

Cycle 0: probability counts of run=0, 1, 2, and total count of all runs>2

Cycle 1 to 9: probability counts of EOB, sEOB, run=0, 1, 2, and total count of all runs>2

With the approach outlined above, the size of runStats, and associated memory requirements, can be substantially reduced, e.g., from 166 entries to 58 entries.

Initialization of the runStats, EOBshift, sEOBshift, and cbSelect parameters will now be described. For luma 4×4 blocks, as an example, the EOBshift, sEOBshift, and cbSelect tables may be initialized substantially as follows:

EOBshiftInit[ ]={16, 2, 1, 0, 0, 0, 0, 0, 0, 0, 0, 0, 0, 0, 0, 0};
sEOBshiftInit[ ]={16, 6, 6, 6, 6, 6, 6, 6, 6, 6, 6, 5, 4, 3, 2, 1};
cbSelectInit[ ]={1, 1, 1, 0, 0, 0, 0, 0, 0, 0, 0, 0, 0, 0, 0, 0}.

The array runStats may be initialized to all zeros. Alternatively, the array runStats may be initialized to small numbers for each entry in the array. As an example, for cycle 0, the probability counts in runStats may be initialized to {16, 8, 8, 4, 4, . . . }, which may be typical probability counts of runs in coding cycle 0. The corresponding entry in runStats is incremented each time a particular run or EOB or sEOB in a given cycle is coded. Using the example in FIG. 7, for block 1, run=0 is coded in coding cycle 0. Therefore, the entry runStats[cycle=0][run=0] is incremented.

Because coding of magnitudes of those significant coefficients with magnitudes greater than 1 is delayed until the end of block (a special EOB in this case) is sent, a special condition may be encountered in which there are no more significant coefficients to be coded after the current zero run is sent. In other words, the remaining coefficients in the block, if any, are all refinement coefficients. In this case, the encoder may be configured to send a 1-bit flag, with 0 indicating that no significant coefficient in the block has magnitude greater than 1, and 1 indicating that there are significant coefficients with magnitude greater than 1 in the block. If this flag is 1, the usual coding of the magnitude values (starting with the token term- Sym) as described above is performed. Under this special condition, the accumulated statistics in runStats will not be changed.

Updating of the coding parameters EOBshift, sEOBshift, and cbSelect will now be described. As shown in FIG. 11, at fixed points throughout coding of the video blocks in a video slice, video encoder 20 invokes the updating process of the coding tables to stay in tune with the accumulated symbol statistics. One reasonable choice for updating these tables is at the macroblock (MB) boundary, although other choices of updating points may also be used. For example, the updating process may happen on the 4×4 or 8×8 block boundary, or after certain number of blocks/macroblocks have been coded. Set forth below is example pseudo code illustrating a simple scheme that can be used to update these tables.

```
for (all cycles c<C)
{
  // update EOBshift and sEOBshift
  if(c > 0)
  {
    if (runStats[c][0]>runStats[c][2])
      EOBshift[c] = 0;
    else if (runStats[c][0]>runStats[c][3])
      EOBshift[c] = 1;
    else if (runStats[c][0]>runStats[c][4])
      EOBshift[c] = 2;
    else
      EOBshift[c] = 3;
    if( runStats[c][1]>runStats[c][4])
      sEOBshift[c] = EOBshift[c]+1;
    else if (runStats[c][1]>(runStats[c][0]/16))
      sEOBshift[c] = 4;
    else
      sEOBshift[c] = (16-c);
  }
  // update cbSelect
  let A, B, C be counts of the three most probable symbols in coding
  cycle c
  let D be the total count of all other symbols in coding cycle c
  if (D<=B)
  {
    if(3*D <= 2*A)
      cbSelect[c] = (C+D<=A) ? cb0:cb2;
    else
      cbSelect[c] = (2*C<=D) ? cb1:cb2;
  }
  else
  {
    if(2*B+D<=2*A)
      cbSelect[c] = (B+C<=A) ? cb4:cb2;
    else
      cbSelect[c] = (2*C<=D) ? cb1:cb2;
  }
}
```

In SVC JD9, an EOB or sEOB symbol will not occur in coding cycle 0. Therefore, the tables EOBshift, sEOBshift are only updated for coding cycle $c>0$ and $c<C$. As in the example depicted by the pseudo code above, it is assumed that, for all cycle $c>0$ and $c<C$, runStats[c][0] stores the accumulated EOB probability, runStats[c][1] stores the accumulated special EOB probability, and runStats[c][s] (s=2, 3, 4) stores the accumulated probability for zero run "r=s−2", respectively. For all cycle $c>0$ and $c<C$, based on the contents of runStats[c][0], runStats[c][1], and runStats[c][s], video encoder 20 updates the values of EOBshift[c], sEOBshift[c] and cbSelect[c].

Updating of the EOBshift table is now described for coding cycle $c>0$ and $c<C$. As an example, if the EOB count indicated by runStats[c][0] is greater than the zero run count indicated by runStats[c][2] for run length r=0 (i.e., s=2), then the value of EOBshift[c] is set to zero, as indicated in the pseudo code above. Otherwise, if runStats[c][0] is less than or equal to runStats[c][2], but runStats[c][0] is greater than the zero run count indicated by runStats[c][3] for run length r=1 (i.e., s=3), then the value of EOBshift[c] is set to 1. Otherwise, if runStats[c][0] is less than or equal to both runStats[c][2] and runStats[c][3], but runStats[c][0] is greater than the zero run count indicated by runStats[c][4] for run length r=2 (i.e., s=4), then the value of EOBshift[c] is set to 2. Otherwise, the value of EOBshift[c] is set to 3.

Updating of the sEOBshift table is now described for coding cycle $c>0$ and $c<C$. As an example, if the sEOB count indicated by runStats[c][1] is greater than the zero run count indicated by runStats[c][4] for run length r=2 (i.e., s=4), then the value of sEOBshift[c] is set to equal the value of EOBshift[c] plus 1. Otherwise, if runStats[c][1] is less than or equal to runStats[c][4], but runStats[c][1] is greater than the EOB count indicated by runStats[c][0] divided by 16, then the value of sEOBshift[c] is set to 4. Otherwise, the value of sEOBshift[c] is set to equal 16 minus the cycle number c.

Updating of the table cbSelect is now described for all coding cycles $c<C$. To update the value of cbSelect[c], video encoder 20 tracks the three most probable symbols. Denote the probability counts of the three most probable symbols in the combined symbol set that contains zero runs, EOB, and sEOB as A, B, and C, and denote the total count of all other symbols as D. In this case, if D is less than or equal to B, and 3 times D is less than or equal to 2 times A, then the value of cbSelect[c] designates codebook 0 (cb0) if C plus D is less than or equal to A and designates codebook 1 (cb1) if C plus D is greater than A. Otherwise, if D is less than or equal to B, and 3 times D is greater than 2 times A, then the value of cbSelect[c] designates cb1 if 2 times C is less than or equal to D and designates codebook 2 (cb2) if 2 times C is greater than D. The remaining operations are readily apparent from the pseudo code above.

As indicated in the pseudo code above, video encoder 20 updates the EOB shift table based on the accumulated counts of zero runs, EOB symbols, and sEOB symbols for corresponding coding conditions, updates the sEOB shift table based on the accumulated counts of zero runs, EOB symbols and sEOB symbols for corresponding coding conditions, and updates the codebook selection table based on the accumulated counts of zero runs, EOB symbols, and sEOB symbols for corresponding coding conditions.

Although the pseudo code illustrates updating of the EOB shift table, sEOB shift table, and codebook selection table entries based on specific relationships among the EOB, sEOB and zero run counts for purposes of illustrations, other relationships may be used. Accordingly, other updating processes may also be used, and various modifications to the example above may be made without departing from the scope of this disclosure. For example, although the pseudo code above refers to coding cycles as used in SVC JD9, other coding conditions may be used as an index for the counts and coding parameters. As one example, VLC coding may be conditioned upon the current subband or cluster of subbands of a block to which the zero run, EOB, or sEOB belongs. As another example, VLC coding may also be conditioned upon the number of zero runs that have been coded for a block.

Another condition may be added to improve coding performance of the adaptive scheme. At the beginning of the coding process for a slice, for example, when the symbol statistics have not been sufficiently accumulated, updating of the EOBshift, sEOBshift, and cbSelect tables may result in statistically insignificant entries. Therefore, thresholds on the total number of symbols encountered in each cycle may be applied to decide whether the EOBshift, sEOBshift, and cbSelect table entries should be updated. In this case, an optional condition may be applied such that only cycles having a total symbol count that reaches or exceeds the corresponding threshold may start updating their table entries. As an illustration, the threshold array {32, 16, 8, 8, 8, 8 . . . } may be used to determine whether to start updating the table entries, where the entries in the threshold array correspond, in order, to cycle 0, cycle 1, cycle 2, cycle 3, and so forth. For example, for cycle 0, a total of 32 symbols need to have been encountered before the updating process will start. Likewise, for cycle 1, a total of 16 symbols need to have been encountered before the updating process will start. Hence, a greater number of symbols may be required to start updating the VLC coding parameters for earlier cycles. As an alternative to applying the threshold on the total number of entries encountered within a given coding cycle, the threshold may instead be applied on the accumulated count of the most probable symbol in a given coding cycle.

An example technique for normalization of the runStats array will now be described. Normalization involves scaling down the symbol counts in the runStats array when they reach a certain threshold. Normalization may be useful in preventing symbol count overflow. In addition, normalization may also provide more room for local adaptability as it prevents symbol counts from building up too much in some regions and overwhelming the local statistics of other regions. The normalization process may take place at the same time the EOBshift, sEOBshift, and cbSelect tables are updated, e.g., on a periodic basis such as at MB boundaries. Alternatively, or additionally, the normalization process may take place at other fixed points throughout the video coding process. Set forth below is a pseudo code segment illustrating an example process for normalizing the runStats array.

```
for (all cycles c<C) // C is the cycle cutoff in runStats
{
    let MPS be the count of the most probable symbol in the cycle
    if (MPS >= MPSthres)
        scale back all symbol counts in the current cycle by a factor of 2
}
```

In the above pseudo code, a reasonable choice for MPSthres may be 128. However, other values of MPSthres may be used. In general, when the count of the most probable symbol (MPS) in the cycle is greater than or equal to MPSthres, video encoder 20 normalizes the symbol counts by scaling the symbol counts downward in the current cycle by a factor of N, i.e., by dividing by a factor of N. In the example above, factor N is equal to 2. Alternatively, a total count of all symbols and a corresponding threshold for total count in the current coding cycle may be used for normalization in place of the MPS count and the corresponding threshold MPSthres.

To reduce the frequency of updating the coding tables, as an option, the update frequency may be dynamically changed. Updating the coding tables can be costly for some applications even with the low complexity solutions presented above. Therefore, to reduce update frequency and associated computing and memory overhead, the update frequency can be dynamically changed based on various criteria. As one example, the update frequency may be dynamically adjusted based on how much the coding tables have changed in the recent update operations. If recent update operations have resulted in little change for the coding tables, then the update frequency may be reduced. If recent update operations have resulted in greater change, the update frequency can be dynamically increased.

An example process for coding luma blocks will now be described. In this example, luma blocks are coded using an 8×8 transform, e.g., as used in many video coding standards such as MPEG1, MPEG2, MPEG4, and H.263. In the H.264/AVC high profile, also known as FRext (Fidelity Range extension), the luma component in a macroblock may be coded using either an 8×8 integer transform or a 4×4 integer transform, and the block transform size is coded in the bitstream as a macroblock level syntax element. This is referred to as adaptive block transform. If the 8×8 transform is used, then there will be four 8×8 luma coefficient blocks in a macroblock after transform and quantization, instead of sixteen 4×4 luma blocks if 4×4 transform is used. Although the coding process described above uses as an example a coefficient block from a 4×4 transform, the process can be readily adapted to coding of 8×8 transform blocks using similar concepts.

As one example, an 8×8 block can be converted into four 4×4 blocks first. This approach is used in the CAVLC entropy coding mode specified by the H.264/AVC standard. For example, video encoder 20 can be configured to scan an 8×8 coefficient block in zigzag scanning order and convert it into a 1-D array with 64 coefficients. Then, video encoder 20 disassembles the 64 coefficients into four arrays with 16 coefficients each using the interleaving scheme. Specifically, a coefficient at the n-th (n=0, 1 . . . 63) scanning position in 8×8 zigzag scanning order in the 64-coefficient array will be placed into the m-th block, where m=mod(n,4), m=0, 1, 2, or 3, at the (n/4)-th scanning position in the smaller block. After this conversion, video encoder 20 applies the usual CAVLC coding for 4×4 blocks to the four 16-coefficient blocks.

In SVC, when the base layer uses the H.264/AVC high profile, the enhancement layer also allows the use of the 8×8 block transform. In the FGS layer, an 8×8 coefficient block may be converted using the same interleaving scheme as the base layer and coded as four 4×4 blocks. The accumulated statistics of such converted 4×4 blocks may be similar to those of the native 4×4 blocks. Therefore, video encoder 20 may code the converted 4×4 blocks together with all other native 4×4 coefficients using the same EOBshift, sEOBshift, and cbSelect tables. Alternatively, video encoder 20 may be configured to store the accumulated statistics separately for the converted 4×4 blocks and use separate EOBshift, sEOBshift, and cbSelect tables to code such converted 4×4 blocks.

Coding of chroma DC and chroma AC components will now be described. In SVC, the chroma coefficient blocks are coded separately as chroma DC and chroma AC blocks. The DC coefficients of the four 4×4 blocks in each 8×8 chroma block are grouped into and coded as one DC block. Each chroma DC block is coded in four cycles (cycle=0, 1, 2, 3). The remaining 15 chroma AC coefficients (except the DC coefficient) in each 4×4 chroma block are coded in 15 cycles (cycle=1, 2, . . . 15). Because the symbol statistics of the chroma DC and AC blocks are sufficiently different from each other and from luma blocks, maintaining separate internal states for chroma DC and AC, and for luma, in the adaptive scheme described in this disclosure improves chroma coding performance.

The adaptive coding of chroma DC and AC is similar to the luma coding procedure. For example, the arrays runStatsDC and runStatsAC may be used to separately store the accumulated statistics for chroma DC and chroma AC, respectively. The tables EOBshiftXX, sEOBshiftXX, and cbSelectXX (with XX being substituted with DC or AC) are used to identify the EOB shift, special EOB shift, and codebook selection for each coding cycle, for either chroma DC or chroma AC. Because the chroma statistics are different from those of luma, the tables EOBshiftXX, sEOBshiftXX, and cbSelectXX may be initialized differently. As an example, the tables may be initialized with the following vectors:

EOBshiftDCInit[ ]={4, 0, 0, 0};
sEOBshiftDCInit[ ]={4, 4, 3, 2};
cbSelectDCInit[ ]={0, 0, 0, 0};
EOBshiftACInit[ ]={16, 0, 0, 0, 0, 0, 0, 0, 0, 0, 0, 0, 0, 0, 0};
sEOBshiftACInit[ ]={16, 8, 8, 8, 8, 8, 8, 8, 7, 6, 5, 4, 3, 2, 1}; and
cbSelectACInit[ ]={0, 0, 0, 0, 0, 0, 0, 0, 0, 0, 0, 0, 0, 0, 0}, where EOBshiftDCInit[ ] represents the initial entries for the EOB shift table for chroma DC, sEOBshiftDCInit[ ] represents the initial entries for the special EOB shift table for chroma DC, cbSelectDCInit[ ] represents the initial entries for the codebook selection table for chroma DC, EOBshiftACInit[ ] represents the initial entries for the EOB shift table for chroma AC, sEOBshiftACInit[ ] represents the initial entries for the special EOB shift table for chroma AC, cbSelectACInit[ ] represents the initial entries for the codebook selection table for chroma AC. Note that initialization tables for chroma DC contain 4 entries because chroma DC needs 4 coding cycles, and initialization tables for chroma AC contain 15 entries because chroma AC needs 15 coding cycles.

In the commonly used YUV4:2:0 video format, there are half as many chroma coefficients as luma coefficients. Some simplifications may be applied to the adaptive coding of chroma DC and AC. These simplifications can reduce the memory required to store accumulated statistics, and the number of updating operations. For example, the updating process for chroma DC may be skipped, eliminating the need to store the array runStatsDC and all updating operations associated with the tables EOBshiftDC, sEOBshiftDC, and cbSelectDC. The updating process of chroma AC may also be skipped. Alternatively, the updating process for chroma AC may be similar to the updating process for luma but with reduced complexity. For example, video encoder 20 may be configured to update chroma AC tables half as frequently as the luma tables, as there are half as many chroma AC blocks. In summary, VLC coding of chroma DC and chroma AC blocks may be performed separately from one another and separately from luma blocks. EOB shift tables, sEOB shift tables, and codebook selection tables for the chroma DC and AC blocks may be initialized differently from the luma blocks. In some cases, fixed EOB shift tables, sEOB shift tables, and codebook selection tables may be used for the chroma DC and AC blocks.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

The invention claimed is:

1. A method comprising:
performing variable length code (VLC) coding of digital video block coefficients using VLC parameters, wherein the VLC parameters comprise a shift table indicating for each of a plurality of different coding conditions, an index of a special end-of-block (sEOB) symbol within a symbol set comprising zero run symbols, an end-of-block (EOB) symbol, and the sEOB symbol based on a probability of an end-of-block in the respective coding condition, wherein performing VLC coding comprises coding the special end-of-block (sEOB) symbol to indicate presence within a block of one or more coefficients having magnitudes greater than one;
collecting coding statistics during the VLC coding of the digital video block coefficients; and
adjusting one or more of the VLC parameters during the VLC coding based on the collected coding statistics.

2. The method of claim 1, further comprising initializing the VLC parameters at a start of a slice comprising blocks of the digital video block coefficients.

3. The method of claim 1, wherein adjusting the one or more VLC parameters comprises adjusting the one or more VLC parameters at selected intervals within a slice comprising blocks of the digital video block coefficients.

4. The method of claim 1, wherein adjusting the one or more VLC parameters comprises adjusting the one or more VLC parameters at boundaries of blocks within a slice comprising blocks of the digital video block coefficients.

5. The method of claim 1, wherein performing VLC coding comprises coding positions of nonzero block coefficients within a block as zero runs preceding the nonzero block coefficients using the VLC parameters.

6. The method of claim 5, wherein performing VLC coding comprises selecting different VLC parameters based on different coding conditions within the block.

7. The method of claim 1, wherein performing VLC coding comprises coding magnitude information for the one or more coefficients having magnitudes greater than one after the sEOB symbol is coded.

8. The method of claim 7, wherein the VLC parameters further comprise, an end-of-block (EOB) shift table indicating an index of an EOB symbol within a symbol set comprising zero run symbols, the EOB symbol, and the sEOB symbol based on a probability of an end-of-block for each of the coding conditions, and a VLC codebook selection table indicating a VLC codebook used to code indices of the symbols in the symbol set for each of the coding conditions.

9. The method of claim 7, wherein the shift table indicates, for each of the coding conditions, the index of the sEOB symbol within a the symbol set comprising zero run symbols, the EOB symbol, and the sEOB symbol based on a probability of an end-of-block when at least one of the nonzero coefficients has a magnitude of greater than one, and the VLC parameters further comprise a parameter indicating the magnitude information for the coefficients in the block with magnitudes greater than one coded using a fixed VLC table, wherein the parameter indicating the magnitude information is based on a number of the nonzero coefficients within the block having a magnitude of greater than one, and a maximum magnitude of the coefficients within the block having a magnitude of greater than one.

10. The method of claim 7, wherein collecting coding statistics comprises collecting accumulated counts of zero runs, end-of-block (EOB) symbols and sEOB symbols for different coding conditions, and adjusting one or more of the VLC parameters comprises adjusting the one or more VLC parameters based on the accumulated counts.

11. The method of claim 10, wherein collecting coding statistics comprises collecting the accumulated counts of zero runs, EOB symbols and sEOB symbols for less than all coding conditions, and wherein adjusting one or more of the VLC parameters comprises adjusting the one or more VLC parameters for less than all coding conditions.

12. The method of claim 10, wherein collecting coding statistics comprises collecting the accumulated counts of zero runs for less than all zero runs.

13. The method of claim 10, wherein the coding conditions include coding cycles, and collecting coding statistics comprises collecting the accumulated counts of zero runs, EOB symbols and sEOB symbols for coding cycles with numbers less than C, and not collecting the accumulated counts of zero runs, EOB symbols and sEOB symbols for coding cycles with numbers greater than or equal to C, wherein C is less than a maximum number of the coding cycles.

14. The method of claim 13, wherein collecting coding statistics comprises collecting the accumulated counts of zero runs for each of the zero runs having lengths less than S, and collecting a combined count of zero runs for the zero runs having lengths greater than or equal to S, wherein S is less than a maximum length of the zero runs.

15. The method of claim 10, further comprising updating an EOB shift table indicating an index of the EOB symbol within a symbol set comprising zero run symbols, the EOB symbol, and the sEOB symbol based on the probability of the end-of-block for the respective coding condition based on the accumulated counts of zero runs, EOB symbols, and sEOB symbols for corresponding coding conditions, updating the shift table indicating the index of the sEOB symbol within a symbol set comprising zero run symbols, the EOB symbol, and the sEOB symbol based on a probability of a special end-of-block when at least one nonzero coefficient in the block has a magnitude greater than one for the respective coding condition based on the accumulated counts of zero runs, EOB symbols and sEOB symbols for corresponding coding conditions, and updating a VLC codebook selection table indicating a VLC codebook used to code indices of the symbols in the symbol set for the respective coding condition based on the accumulated counts of zero runs, EOB symbols, and sEOB symbols for corresponding coding conditions.

16. The method of claim 10, further comprising normalizing the accumulated counts at selected intervals within a slice comprising blocks of the digital video block coefficients.

17. The method of claim 5, further comprising performing VLC coding of chroma DC and chroma AC blocks separately from one another and separately from luma blocks using separate end-of-block (EOB) shift tables, special end-of-block (sEOB) shift tables, and VLC codebook selection tables to code the chroma DC and AC blocks, wherein each of the EOB shift tables indicates an index of the EOB symbol within a symbol set comprising zero run symbols, the EOB symbol, and the sEOB symbol based on the probability of the end-of-block for the respective coding condition, each of the VLC codebook selection tables indicates a VLC codebook used to code indices of the symbols in the symbol set for a respective coding condition, and each of the sEOB shift tables indicates an index of the sEOB symbol within a symbol set comprising zero run symbols, an end-of-block (EOB) symbol, and the sEOB symbol based on a probability of an end-of-block for the respective coding condition when at least one of the nonzero coefficients has a magnitude of greater than one.

18. The method of claim 17, further comprising adjusting the EOB shift tables, the sEOB shift tables, and VLC codebook selection tables for the chroma DC and AC blocks based on coding statistics collected for the chroma DC and AC blocks.

19. The method of claim 17, further comprising initializing the EOB shift tables, sEOB shift tables, and VLC codebook selection tables for the chroma DC and AC blocks differently from the luma blocks.

20. The method of claim 17, further comprising using fixed EOB shift tables, sEOB shift tables, and VLC codebook selection tables for the chroma DC and AC blocks.

21. The method of claim 1, further comprising performing the VLC coding of the digital video block coefficients both within a first entropy coding unit at a video encoder and within a second entropy decoding unit at a video decoder to encode and decode the digital video block coefficients.

22. The method of claim 1, wherein the digital video block coefficients represent block coefficients in a fine granularity scalability (FGS) enhancement layer of a scalable video coding (SVC) slice comprising the enhancement layer and at least one base or previous layer, wherein coding positions of nonzero block coefficients within a block comprises coding positions of significant coefficients, and wherein the significant coefficients in the enhancement layer are coefficients for which corresponding coefficients in the base or previous layer are zero.

23. A video coding device comprising a variable length code (VLC) unit configured to perform VLC coding of digital video block coefficients using VLC parameters, wherein the VLC parameters comprise a shift table indicating for each of a plurality of different coding conditions, an index of a special end-of-block (sEOB) symbol within a symbol set comprising zero run symbols, an end-of-block (EOB) symbol, and the sEOB symbol based on a probability of an end-of-block in the respective coding condition, wherein the VLC unit is configured to code the special end-of-block (sEOB) symbol to indicate presence within a block of one or more coefficients having magnitudes greater than one, collect coding statistics during the VLC coding of the digital video block coefficients, and adjust one or more of the VLC parameters during the VLC coding based on the collected coding statistics.

24. The device of claim 23, wherein the VLC unit is configured to initialize the VLC parameters at a start of a slice comprising blocks of the digital video block coefficients.

25. The device of claim 23, wherein the VLC unit is configured to adjust the one or more VLC parameters at selected intervals within a slice comprising blocks of the digital video block coefficients.

26. The device of claim 23, wherein the VLC unit is configured to adjust the one or more VLC parameters at boundaries of blocks within a slice comprising blocks of the digital video block coefficients.

27. The device of claim 23, wherein the VLC unit is configured to code positions of nonzero block coefficients within a block as zero runs preceding the nonzero block coefficients using the VLC parameters, and to select different VLC parameters based on different coding conditions within the block.

28. The device of claim 27, wherein the VLC unit is configured to select different VLC parameters based on different coding conditions within the block.

29. The device of claim 23, wherein the VLC unit is configured to code magnitude information for the one or more coefficients having magnitudes greater than one after the sEOB symbol is coded.

30. The device of claim 29, wherein the VLC parameters further comprise, an end-of-block (EOB) shift table indicating an index of an EOB symbol within a symbol set comprising zero run symbols, the EOB symbol, and the sEOB symbol based on a probability of an end-of-block for each of the coding conditions being tracked, and a VLC codebook selection table indicating a VLC codebook used to code indices of the symbols in the symbol set for each of the coding conditions being tracked.

31. The device of claim 29, wherein shift table indicates, for each of the coding conditions being tracked, the index of the sEOB symbol within the symbol set comprising zero run symbols, the EOB symbol and the sEOB symbol based on a probability of an end-of-block when at least one of the nonzero coefficients has a magnitude of greater than one, and the VLC parameters further comprise a parameter indicating the magnitude information for the coefficients in the block with magnitudes greater than one coded using a fixed VLC table, wherein the parameter indicating the magnitude information is based on a number of the nonzero coefficients within the block having a magnitude of greater than one and a maximum magnitude of the nonzero coefficients within the block having a magnitude of greater than one.

32. The device of claim 29, wherein the VLC unit is configured to collect coding statistics including accumulated counts of zeros runs, end-of-block (EOB) symbols and sEOB symbols for different coding conditions, and adjust one or more of the VLC parameters based on the accumulated counts.

33. The device of claim 32, wherein the VLC unit collects the accumulated counts of zero runs, EOB symbols and sEOB symbols for less than all coding conditions, and adjusts the one or more VLC parameters for less than all coding conditions.

34. The device of claim 32, wherein the VLC unit collects the accumulated counts of zero runs for less than all zero runs.

35. The device of claim 32, wherein the coding conditions include coding cycles, and the VLC unit collects the accumulated counts of zero runs, EOB symbols and sEOB symbols for coding cycles with numbers less than C, and does not collect the accumulated counts of zero runs, EOB symbols and sEOB symbols for coding cycles with numbers greater than or equal to C, wherein C is less than a maximum number of the coding cycles.

36. The device of claim 35, wherein the VLC unit collects the accumulated counts of zero runs for each of the zero runs having lengths less than S, and collects a combined count of zero runs for the zero runs having lengths greater than or equal to S, wherein S is less than a maximum length of the zero runs.

37. The device of claim 32, wherein the VLC unit updates an EOB shift table indicating the index of an EOB symbol within a symbol set comprising zero run symbols, the EOB symbol, and the sEOB symbol based on a the probability of the end-of-block for the respective coding condition based on the accumulated counts of zero runs, EOB symbols, and sEOB symbols for corresponding coding conditions, updates the shift table indicating the index of the sEOB symbol within a symbol set comprising zero run symbols, the EOB symbol, and the sEOB symbol based on a probability of a special end-of-block when at least one nonzero coefficient in the block has a magnitude greater than one for the respective coding condition based on the accumulated counts of zero runs, EOB symbols, and sEOB symbols for corresponding coding conditions, and updates a VLC codebook selection table indicating a VLC codebook used to code indices of the symbols in the symbol set for the respective coding condition based on the accumulated counts of zero runs, EOB symbols, and sEOB symbols for corresponding coding conditions.

38. The device of claim 32, wherein the VLC unit is configured to normalize the accumulated counts at selected intervals within a slice comprising blocks of the digital video block coefficients.

39. The device of claim 27, wherein the VLC unit is configured to perform VLC coding of chroma DC and AC blocks separately from one another and separately from luma blocks using separate end-of-block (EOB) shift tables, special end-of-block (sEOB) shift tables, and VLC codebook selection tables to code the chroma DC and AC blocks, wherein each of the EOB shift tables indicates an index of the EOB symbol within a symbol set comprising zero run symbols, the EOB symbol, and an sEOB symbol based on the probability of an end-of-block for the respective coding condition, each of the VLC codebook selection tables indicates a VLC codebook used to code indices of the symbols in the symbol set for a respective coding condition, and each of the sEOB shift tables indicates an index of the sEOB symbol within a symbol set comprising zero run symbols, an end-of-block (EOB) symbol, and the sEOB symbol based on a probability of an end-of-block for the respective coding condition when at least one of the nonzero coefficients has a magnitude of greater than one.

40. The device of claim 39, wherein the VLC unit is configured to adjust the EOB shift tables, sEOB shift tables, and VLC codebook selection tables for the chroma DC and AC blocks based on coding statistics collected for the chroma DC and AC blocks.

41. The device of claim 39, wherein the VLC unit is configured to initialize the EOB shift tables, sEOB shift tables, and VLC codebook selection tables for the chroma DC and AC blocks differently from the luma blocks.

42. The device of claim 39, wherein the VLC unit is configured to use fixed EOB shift tables, sEOB shift tables, and VLC codebook selection tables for the chroma DC and AC blocks.

43. The device of claim 23, wherein the VLC unit is configured to perform VLC coding to encode the digital video block coefficients or to decode the digital video block coefficients.

44. The device of claim 23, wherein the digital video block coefficients represent block coefficients in a fine granularity scalability (FGS) enhancement layer of a scalable video coding (SVC) slice comprising the enhancement layer and at least one base or previous layer, wherein coding positions of nonzero block coefficients within a block comprises coding positions of significant coefficients, and wherein the significant coefficients in the enhancement layer are coefficients for which corresponding coefficients in the base or previous layer are zero.

45. A video coding device comprising:
means for performing VLC coding of digital video block coefficients using VLC parameters, wherein the VLC parameters comprise a shift table indicating for each of a plurality of different coding conditions, an index of a special end-of-block (sEOB) symbol within a symbol set comprising zero run symbols, an end-of-block (EOB) symbol, and the sEOB symbol based on a probability of an end-of-block in the respective coding condition, wherein performing VLC coding comprises coding the special end-of-block (sEOB) symbol to indicate presence within a block of one or more coefficients having magnitudes greater than one;
means for collecting coding statistics during the VLC coding of the digital video block coefficients; and
means for adjusting one or more of the VLC parameters during the VLC coding based on the collected coding statistics.

46. A non-transitory computer-readable medium comprising instructions to cause a processor to:
perform VLC coding of digital video block coefficients using VLC parameters, wherein the VLC parameters comprise a shift table indicating for each of a plurality of different coding conditions, an index of a special end-of-block (sEOB) symbol within a symbol set comprising zero run symbols, an end-of-block (EOB) symbol, and the sEOB symbol based on a probability of an end-of-block in the respective coding condition, wherein performing VLC coding comprises coding the special end-of-block (sEOB) symbol to indicate presence within a block of one or more coefficients having magnitudes greater than one;
collect coding statistics during the VLC coding of the digital video block coefficients; and
adjust one or more of the VLC parameters during the VLC coding based on the collected coding statistics.

47. A method comprising:
generating variable length code (VLC) parameters; and
performing VLC coding of digital video block coefficients using the VLC parameters,
wherein the VLC parameters comprise a special EOB (sEOB) shift table indicating, for each of a plurality of different coding conditions, an index of an sEOB symbol within a symbol set comprising zero run symbols, an end of block (EOB) symbol, and the sEOB symbol based on a probability of an end-of-block when a block includes one or more nonzero coefficients having a magnitude of greater than one, and wherein performing VLC coding comprises coding the special end-of-block (sEOB) symbol to indicate presence within a block of one or more coefficients having magnitudes greater than one.

48. The method of claim 47, further comprising generating, as one of the VLC parameters, a parameter indicating a magnitude information of the nonzero coefficients within the block coded using a fixed VLC table based on a number of the coefficients within the block having a magnitude of greater than one, and a maximum magnitude of the coefficients within the block having a magnitude of greater than one.

49. The method of claim 47, further comprising including the sEOB shift table in a video slice with, for each of the coding conditions, an index of the sEOB symbol within a symbol set comprising zero run symbols, the EOB symbol, and the sEOB symbol based on a probability of an end-of-block when the block includes one or more nonzero coefficients having a magnitude of greater than one.

50. A video coding device comprising a variable length code (VLC) unit configured to perform VLC coding of digital video block coefficients using VLC parameters, wherein the VLC parameters comprise a special EOB (sEOB) shift table indicating, for each of a plurality of different coding conditions, an index of an sEOB symbol within a symbol set comprising zero run symbols, an end of block (EOB) symbol, and the sEOB symbol based on a probability of an end-of-block when the block includes one or more nonzero coefficients having a magnitude of greater than one, wherein the VLC unit is configured to code the special end-of-block (sEOB) symbol to indicate presence within a block of one or more coefficients having magnitudes greater than one.

51. The device of claim 50, wherein the VLC unit generates, as one of the VLC parameters, a parameter indicating a magnitude information of the nonzero coefficients within the block coded using a fixed VLC table based on a number of the coefficients within the block having a magnitude of greater than one, and a maximum magnitude of the coefficients within the block having a magnitude of greater than one.

52. The device of claim 50, wherein the VLC coding unit includes the sEOB shift table in a video slice indicating, for each of the coding conditions, an index of the sEOB symbol within a symbol set comprising zero run symbols, the EOB symbol, and the sEOB symbol based on a probability of an end-of-block when the block includes one or more nonzero coefficients having a magnitude of greater than one.

53. A device comprising:
means for generating variable length code (VLC) parameters; and
means for performing VLC coding of digital video block coefficients using the VLC parameters,
wherein the VLC parameters comprise a special EOB (sEOB) shift table indicating, for each of a plurality of different coding conditions, an index of an sEOB symbol within a symbol set comprising zero run symbols, an end of block (EOB) symbol, and the sEOB symbol based on a probability of an end-of-block when the block includes one or more nonzero coefficients having a magnitude of greater than one, wherein the means for performing VLC coding comprises means for coding the special end-of-block (sEOB) symbol to indicate presence within a block of one or more coefficients having magnitudes greater than one.

54. A non-transitory computer-readable medium comprising instructions to cause a processor to:
generate variable length code (VLC) parameters; and
perform VLC coding of digital video block coefficients using the VLC parameters,
wherein the VLC parameters comprise a special EOB (sEOB) shift table indicating, for each of a plurality of different coding conditions, an index of an sEOB symbol within a symbol set comprising zero run symbols, an end of block (EOB) symbol, and the sEOB symbol based on a probability of an end-of-block when the block includes one or more nonzero coefficients having a magnitude of greater than one, wherein the instructions cause the processor to code the special end-of-block (sEOB) symbol to indicate presence within a block of one or more coefficients having magnitudes greater than one.

* * * * *